United States Patent [19]
Pratt et al.

[11] Patent Number: 5,272,248
[45] Date of Patent: Dec. 21, 1993

[54] POLYIMIDE PROCESSING ADDITIVES

[75] Inventors: J. Richard Pratt; Terry L. St. Clair; Diane M. Stoakley, all of Poquoson; Harold D. Burks, Newport News, all of Va.

[73] Assignee: The United States of America as Represented by the United States National Aeronautics and Space Administration, Washington, D.C.

[21] Appl. No.: 892,058

[22] Filed: May 22, 1992

Related U.S. Application Data

[63] Continuation of Ser. No. 84,064, Aug. 11, 1987, Pat. No. 5,116,939.

[51] Int. Cl.$^5$ .................. C08G 69/26; C08G 73/10
[52] U.S. Cl. .................. 528/353; 528/170; 528/171; 528/173; 528/174; 528/176; 528/179; 528/185; 528/188; 528/220; 528/229; 528/352
[58] Field of Search ............... 528/353, 179, 174, 185, 528/173, 352, 170, 188, 171, 176, 220, 229

[56] References Cited

U.S. PATENT DOCUMENTS

| | | | |
|---|---|---|---|
| 3,933,749 | 1/1976 | Williams III | 528/188 |
| 3,983,093 | 9/1976 | Williams III | 528/128 |
| 4,107,125 | 8/1978 | Lovejoy | 525/432 |
| 4,142,870 | 3/1979 | Lovejoy | 525/432 |
| 4,281,100 | 7/1981 | Takekoshi | 528/188 |
| 4,444,979 | 4/1984 | St. Clair et al. | 528/172 |
| 4,552,931 | 11/1985 | St. Clair et al. | 427/162 |
| 4,603,061 | 7/1986 | St. Clair et al. | 525/432 |
| 5,116,939 | 5/1992 | Fletcher | 525/432 |

Primary Examiner—John Kight, III
Assistant Examiner—P. Hampton-Hightower
Attorney, Agent, or Firm—George F. Helfrich

[57] ABSTRACT

A process for preparing polyamides having enhanced melt flow properties is described. The process consists of heating a mixture of a high molecular weight poly-(amic acid) or polyimide with a low molecular weight amic acid or imide additive in the range of 0.05 to 15% by weight of additive. The polyimide powders so obtained show improved processability, as evidenced by lower melt viscosity by capillary rheometry. Likewise, films prepared from mixtures of polymers with additives show improved processability with earlier onset of stretching by TMA.

1 Claim, 11 Drawing Sheets

FIG. II
TWO LaRC-TPI-GRAPHITE COMPOSITES
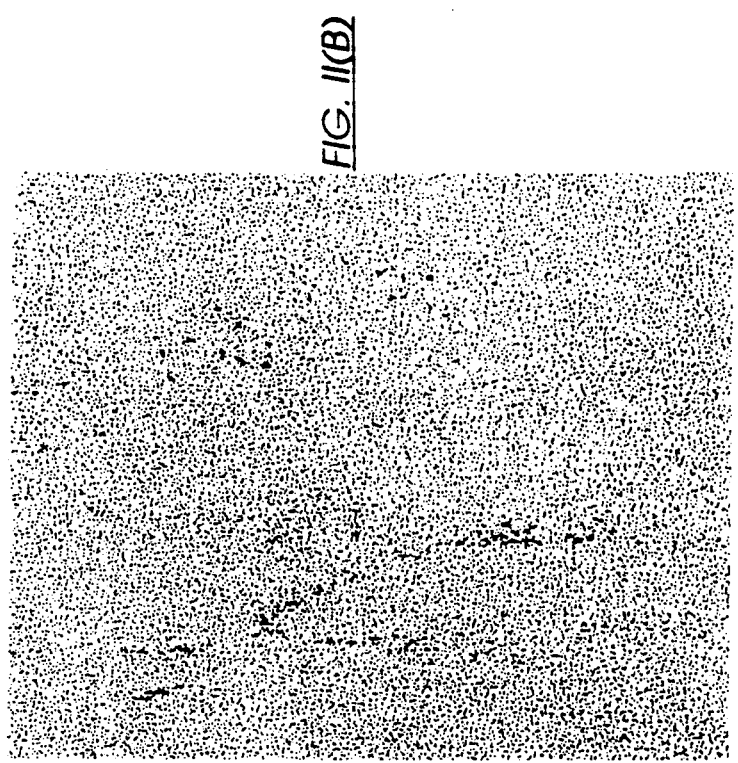
FIG. II(B)
LaRC-TPI modified with 2% by weight PMDA-An•2NMP, di(amic acid) (100x)
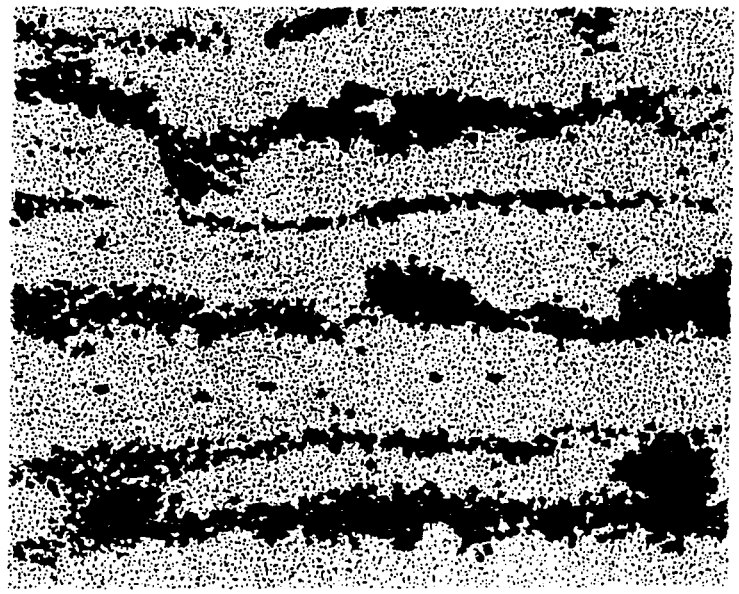
FIG. II(A)
Unmodified LaRC-TPI (100x)

POLYIMIDE PROCESSING ADDITIVES

ORIGIN OF THE INVENTION

The invention described herein was made in the performance of work under a NASA Contract and is subject to the provisions of Section 305 of the National Aeronautics and Space Act of 1958, Public Law 85-568 (72 Stat. 435; 42 USC 2457).

This is a continuation of copending application Ser. No. 084,064, filed on Aug. 11, 1987, now U.S. Pat. No. 5,116,939.

BACKGROUND OF THE INVENTION

1. Field of the Invention

Aromatic polyimides (PI) are usually thought of as being high temperature, high performance plastics that require processing via a poly(amic acid) precursor. This is because polyimides, especially those based on PMDA or BTDA, are usually insoluble in most organic solvents and are either infusible or have very high melting or softening temperatures near that at which decomposition begins. Hence, there exists f need for polyimides for matrix resins and adhesives that exhibit enhanced flow during processing.

2. Prior Art

A patent has recently been granted to St. Clair and Burks (U.S. Pat. No. 4,444,979) for preparing polyphenylene ethers with imide linking groups that are melt processable in the 250°–390° C. range. Other patents also teach the incorporation of ether or sulfide linkages into a polyimide backbone (Williams, III, U.S. Pat. No. 3,933,749 and U.S. Pat. No. 3,983,093 and Takekoshi, U.S. Pat. No. 4,281,100). By diluting the imide ring in the backbone with arylene ether groups, melt processability was improved. Unfortunately, the resulting polymers lack resistance to chlorinated organic solvents.

Plastic materials are routinely mixed with additives to improve such properties as melting temperature, melt flow, flexibility, and elastic modulus, i.e., to improve the processability while not altering the chemical nature of the macromolecule. ("Plastics Additives Handbook," R. Gachter and H. Muller, 2nd ed., 1983, p. 251, Hanser Publishers, New York). Such additives often lower desirable properties such as thermooxidative stability, glass transition temperature and tensile strength. In addition, low molecular weight additives frequently migrate to the surface of the plastic material and impart a characteristic odor, an oily feeling, or other undesirable properties to the material.

Accordingly, the primary object of the present invention is the preparation of melt processable polyimides that maintain desirable polymer properties. This is done by adding small amounts of certain low molecular weight, thermally stable additives.

BRIEF SUMMARY OF THE INVENTION

The thermal treatment of a mixture of approximately 0.05 to 15 percent by weight of an amic acid or imide additive and a poly(amic acid), polyimide, copoly(amic acid) or copolyimide resin improves the ease of processing of the polyimide during the early curing stage by lowering the polymer melt viscosity. Further thermal aging allows the build-up of molecular weight as shown by increases in solution viscosity with concomitant increase in physical properties from this minimum.

This discovery can be utilized in four different ways. Amic acid additives can be added to poly(amic acids); imide additives can be added to poly(amic acids). Likewise, amic acid additives can be added to polyimides and imide additives to polyimides. Mixing the additives and polymers may be achieved by combining the substances in solutions, dispersions, or as mixtures of powders.

BRIEF DESCRIPTION OF THE DRAWINGS

For a more complete understanding of the present invention, reference should be made to the detailed description set forth below. This detailed description should be read together with the accompanying drawings, wherein:

FIG. 11 gives drawings made from photomicrographs of two LARC-TPI-graphite composites.

DETAILED DESCRIPTION OF THE INVENTION

The 422 copoly(amic acid) resin was prepared by copolymerizing 4,4'-oxydianiline (1 mol) and m-phenylenediamine (1 mol) with 4,4'-bis(3,4-dicarboxyphenoxy)diphenylsulfide dianhydride (BDSDA) (2 mol) and encapping with phthalic anhydride (1.0 mol % based on the dianhydride) in bis(2-methoxyethyl)ether (diglyme) at 19.4% solids level at ambient temperature overnight. The resulting poly(amic acid) solution was precipitated in water, and the resulting powder was dried at ambient temperature in vacuo for several days until evolution of volatiles ceased. The powder was imidized by heating in a forced-air oven for 1 hour at 100° C. and 1 hour at 220° C. to give a straw-colored, semiconsolidated powder having the following structure:

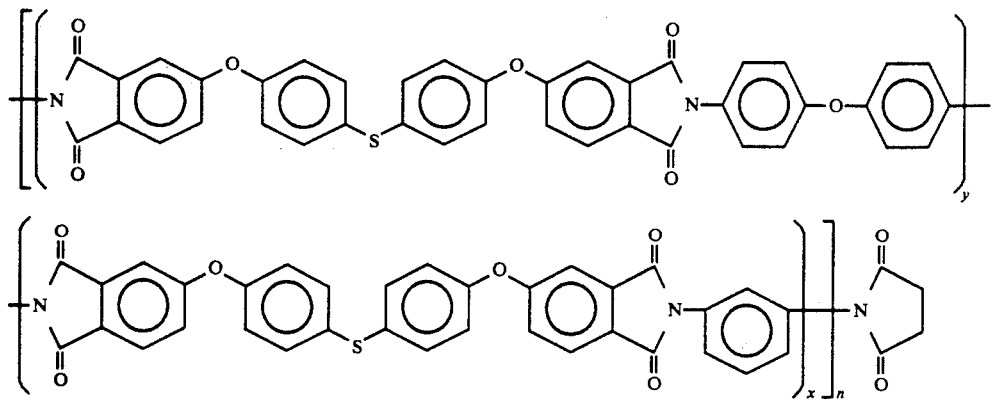

The 6F-BDAF polyimide was prepared by mixing stoichiometric amounts of 2,2-bis(3,4-dicarboxyphenyl) hexafluoropropane dianhydride (6-F dianhydride) and 2,2-bis[4-(4-aminophenoxy)phenyl]hexafluoropropane (BDAF) at 15% solids in DMAc. The imidized, unencapped version has the following structure.

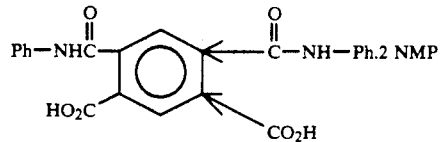

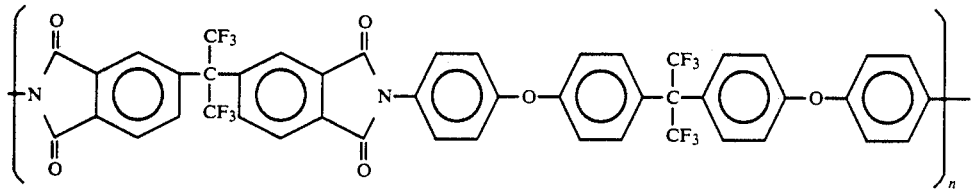

The 6F-BDAF polyimide endcapped with phthalic anhydride was also prepared.

Figure 1:
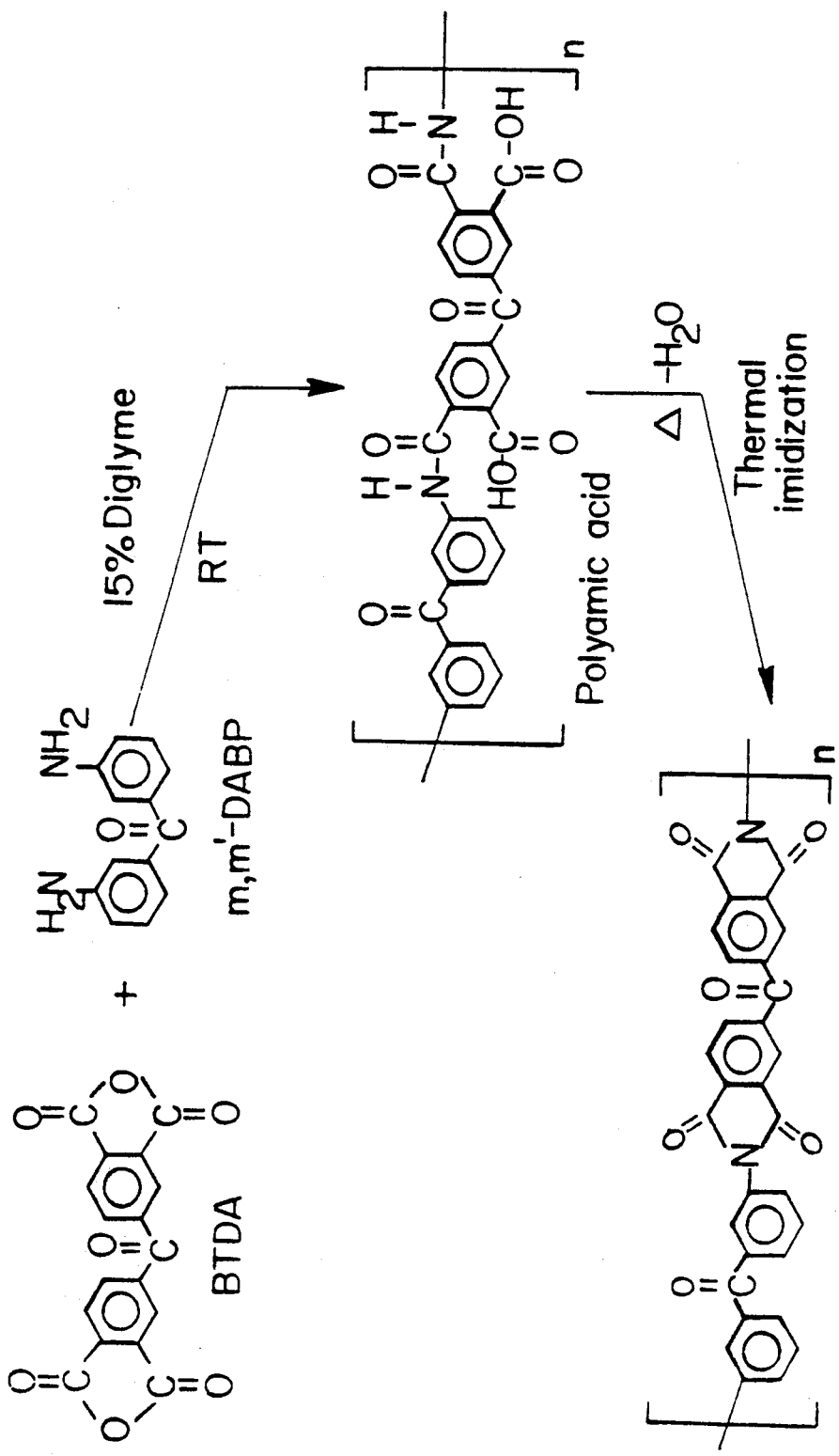
FIG. 1 summarizes the chemistry of LARC-TPI.

Two types of LARC-TPI resin were studied. The first was a commercial material obtained from Mitsui Toatsu, designated LARC-TPI(M), and the second was a laboratory prepared sample designated LARC-TPI(H) (FIG. 1). Both have the following structure, although the LARC-TPI(M) has apparently been modified to have a slightly lower Tg.

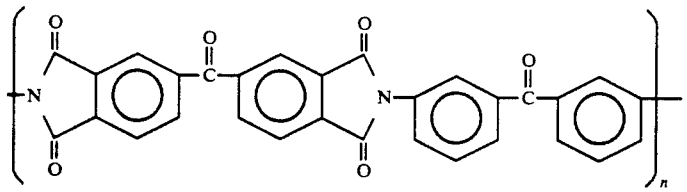

The amic acid additives were prepared by mixing stoichiometric amounts of polymer grade anhydrides and amines in solvents such as 1-methyl-2-pyrrolidinone (NMP), N,N-dimethylacetamide (DMAc), N,N-dimethylformamide (DMF) and diglyme or their mixtures at ambient temperature overnight. The resulting solutions were precipitated in water or toluene to generate powders which were dried at ambient temperature in vacuo to constant weight.

When prepared in approximately equal volumes of NMP, DMF, and diglyme, PMDA and aniline (1:2) reacted to form a compound having the following formula and containing two molecules of NMP.

Other additives can be prepared in this solvent mixture as solvates. They can also be recrystallized from solutions such as acetone-water or DMF-water as amic acids free of solvent molecules.

The order of addition of the amine and the anhydride during the preparation of the additive is important in many cases. For example, when reacting one mole of pyromellitic dianhydride (PMDA) with two moles of aniline in a mixture of NMP-diglyme, it is important to add the aniline to the solution of the PMDA in order to isolate the desired bis(amic acid). If the reverse addition is conducted, one obtains a water soluble solid from the reaction mixture. This solid shows an intense carboxylic acid salt peak at 1592 cm$^{-1}$ (asymmetrical stretching) and three medium peaks at 1420–1335 cm$^{-1}$ (symmetrical stretching) (G. Socrates, "Infrared Characteristic Group Frequencies," John Wiley and Sons, N.Y., (1980), p. 65). The formation of anilinium salts during the reverse addition of PMDA to aniline is not unexpected, due to the low pKa of pyromellitic acid derivatives. Thus, the transiently high concentration of aniline that results as the PMDA crystals dissolve in the aniline solution during the reverse addition allows salt formation to occur between amic acid groups and aniline.

Figure 2:
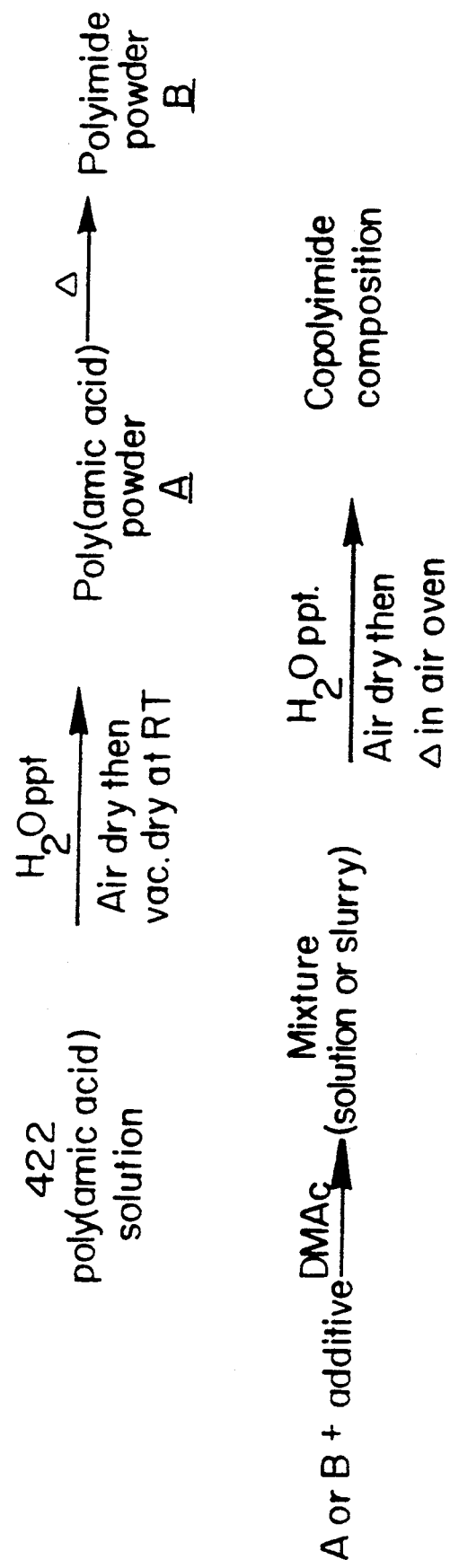
FIG. 2 outlines the preparation of the 422 copolyimide compositions.

Four combinations of additive and polyimide (or poly(amic acid) precursor) were evaluated and found useful in processing polyimides. They were (1) the amic acid additive mixed with the poly(amic acid), (2) the amic acid additive mixed with the polyimide, (3) the imide additive mixed with the poly(amic acid) and the imide additive mixed with the polyimide. (FIG. 2)

The amount of additive which can be usefully mixed with the polymers was found to be approximately 0.05 to 15 percent by weight of poly(amic acid) or polyimide solids. The mixing of the additive with the polymer may be achieved by mixing the additive powder, solution or dispersion with the polymer, which also may be in the powder, solution or dispersion phase.

For example, a solution of a poly(amic acid) in DMAc can be stirred with the desired amount of powdered additive overnight. The resulting mixture can then be precipitated in a blender by pouring into distilled water. This precipitate can be filtered, air dried and thermally imidized. It can then be characterized by capillary rheometry.

In another example the powdered additive is mixed with a solution of a poly(amic acid) in DMAc. The resulting solution or slurry is then used to cast a film for evaluation. The solids from this mixture can also be recovered by precipitation in water or toluene as in the previous example for capillary rheometry studies.

The imidization of the 422 copoly(amic acid) with or without the additives was conducted by heating them in a forced-air oven for one hour at 100° C. followed by one hour at 220° C. LARC-TPI solutions or slurries in diglyme containing the additives were cast into films and dried on glass for 0.5 hour at 60° C., followed by curing one hour each at 100°, 200°, and 300° C. in forced air. The initial drying at 60° C. was required to allow most of the diglyme to evaporate, thus preventing bubble formation in the film. Initial imidization of the 6F-BDAF powders with additives was conducted in a forced-air oven for one hour each at 150°, 250° and 300° C. Further cure studies were conducted at 300° C. for varying lengths of time up to several days. The temperature of the oven was accurately monitored with a thermocouple placed directly above the sample.

Infrared spectra were recorded on a Nicolet 60SX Fourier Transform Infrared spectrometer from KBr pellets. The inherent viscosities (in dl/g) were determined with a Cannon-Ubbelohde viscometer at a concentration of 0.5% (wt./vol.) in DMAc at 35° C. The NMR spectrum was recorded on a Varian EM-360A 60 MHz spectrometer.

A capillary rheometer (Instron, Model 3211) was used to determine the apparent viscosities (in Pascal-seconds) of some of the polymer melts at 350° C. in order to quantify the improved processability of the polymers with additives. The apparent viscosity was calculated by dividing the flow stress by the strain rate. Because the capillary has a sufficiently large length-to-diameter ratio of 33, no correction for wall drag was needed.

Figure 3:
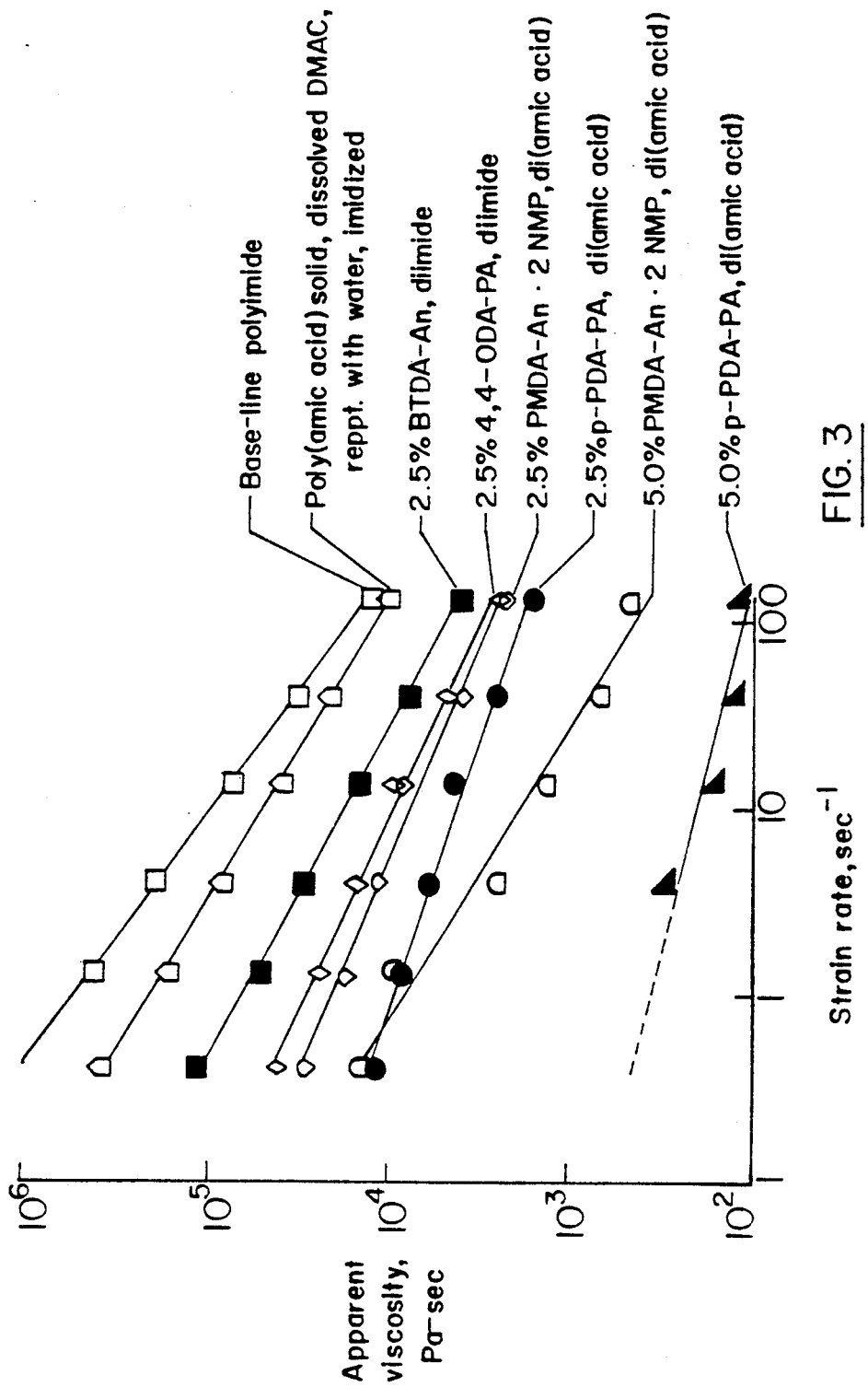
FIG. 3 presents the capillary rheometry study of additives in the imidized 422 poly(amic acid)
Figure 4:
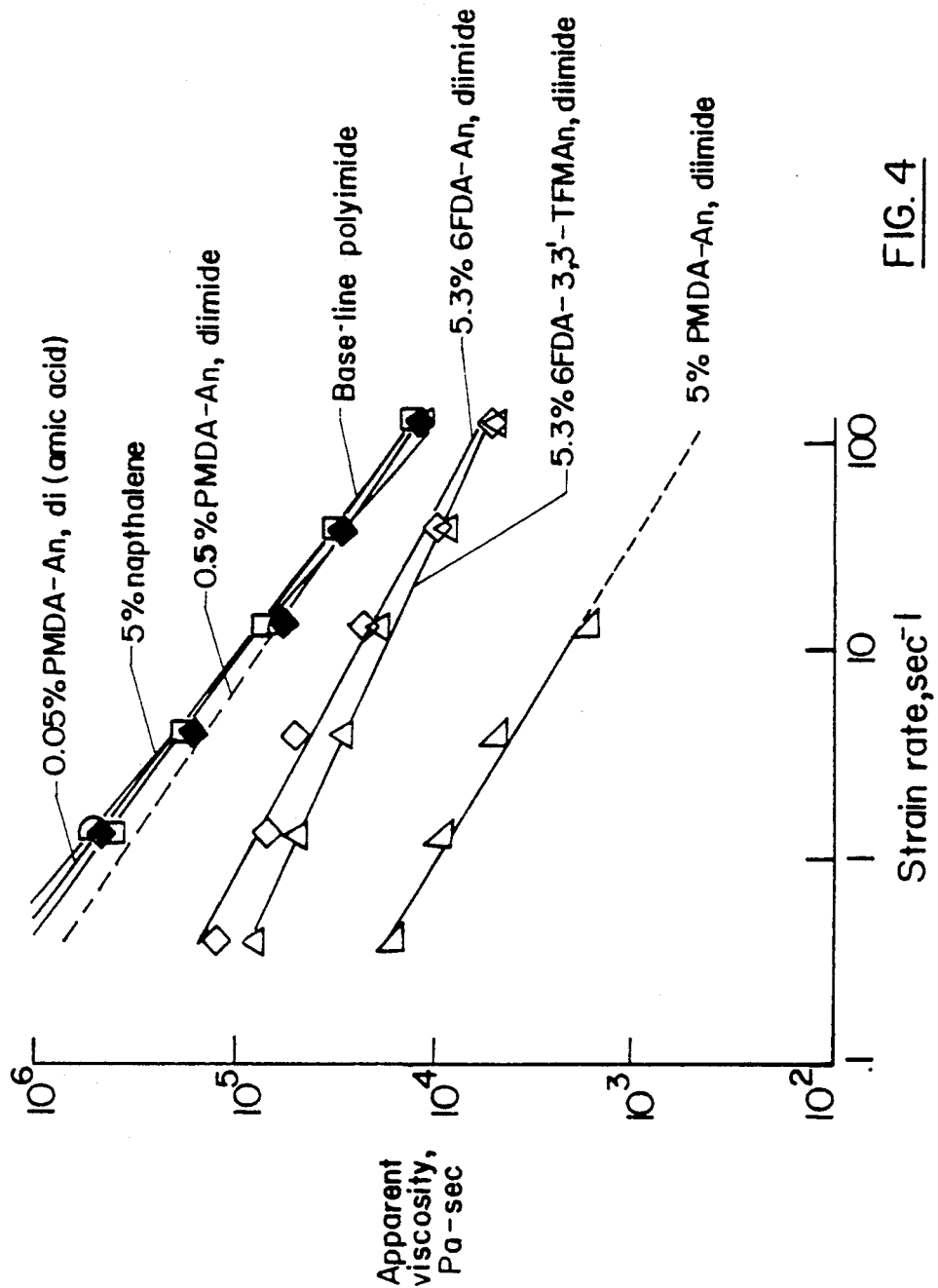
FIG. 4 presents the capillary rheometry study of additives in the 422 polyimide.

FIGS. 3 and 4 record the apparent viscosity-strain rate obtained on the Instron capillary rheometer. A reduction of the melt viscosity is equated with an improvement in processability of the thermoplastic polymer. These figures present the data as individual lines which have been least squares fitted to the data, as well as the individual data points. In FIG. 3 (additives mixed with the 422 poly(amic acid), then imidized) one sees a wide spectrum of melt viscosity lowering, which is dependent on the structure of the additive, its concentration, and the strain rate. The di(amic acids) of PMDA-An.2NMP and p-PDA-PA appear most effective in improving the melt processability of the 422 copolyimide. The viscosity-strain rate lines clearly show the efficacy of all six additives in improving the melt processability of the polyimide.

To a lesser extent the same phenomenon is seen when the additives are incorporated in the polyimide (FIG. 4). For comparison the incorporation of 5% by weight of napthalene is seen to have little effect on processability of the same polyimide.

Figure 5:
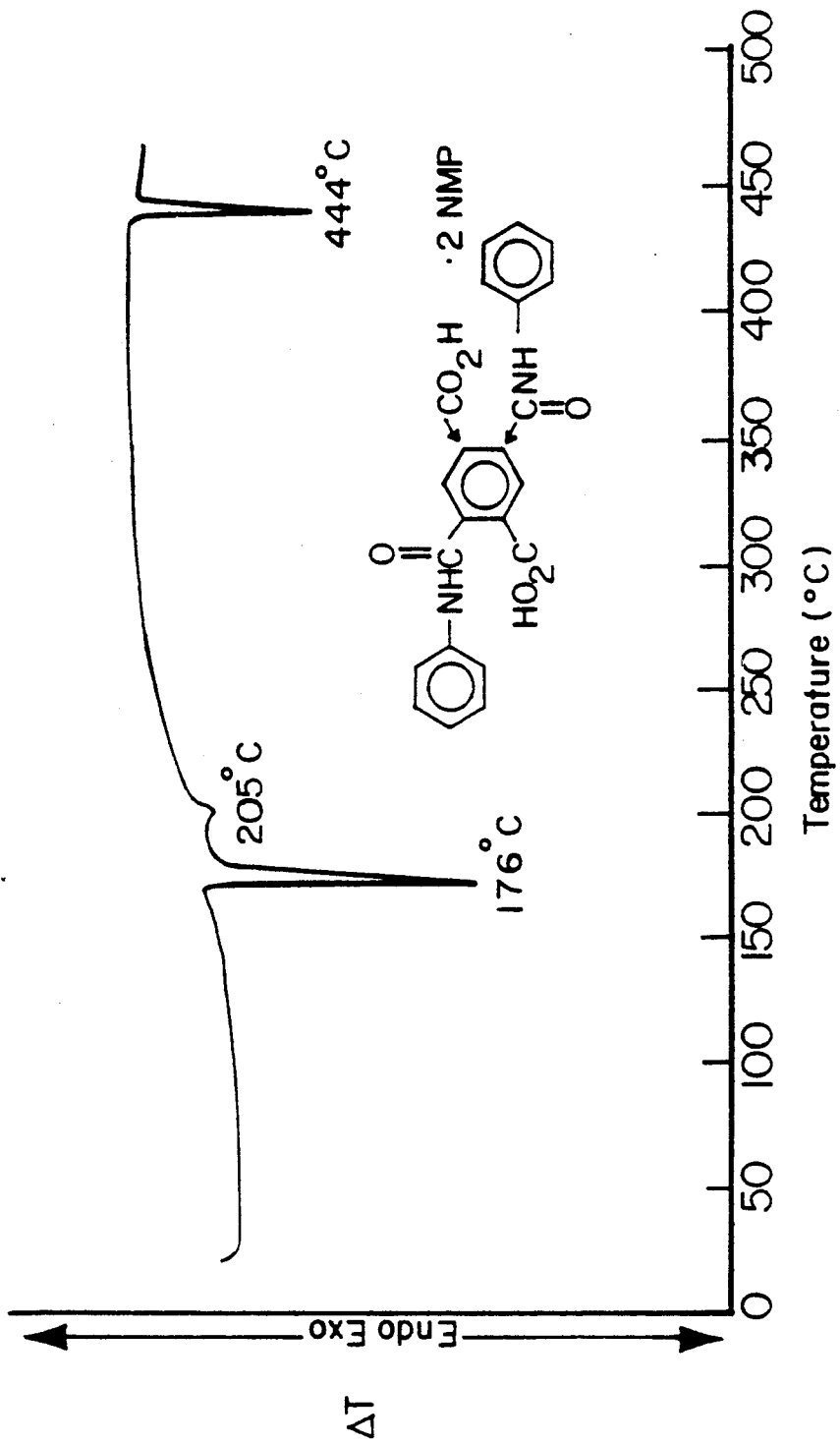
FIG. 5 presents the DTA of the PMDA-AN.2NMP di(amic acid) additive.

This invention claims the production of mixtures of poly(amic acids), polyimides, or their copolymers with amic acid or imide additives that have lowered melt viscosities after cure when compared to unmodified polyimides. Thus, one achieves an enhanced flow of the melt during processing of these thermoplastics. For example, this invention will be useful in preparing polyimide composites that exhibit better flow out of the resin onto the fiber at a lower processing temperature to generate void-free materials. Likewise, this invention can be applied to preparing high temperature polyimide adhesives that allow enhanced wetting of the adherends and ultimately, better adhesion. By controlling the amount of the additive, one can optimize the flow of the polyimide. For example, use of a controlled level of additive in a thermoplastic polyimide resin will allow one to completely wet the substrate but avoid excessive viscosity lowering that would cause the adhesive to flow through the bond line. A postcured composition would be expected to remain stable, due to the inert nature of the imidized additives. An example of this behavior is shown in the DTA of PMDA-aniline.2NMP diamic acid additive (FIG. 5). This compound melted sharply at approximately 175° C., followed by a second endotherm at 204° C. which appeared to result from the loss of NMP. A broad, poorly defined exotherm was then observed due to imidization with loss of water. This resulted in the formation of N,N'-diphenyl-pyromellitimide, which melted sharply at approximately 444° C. Thus, the amic acid additive, to the extent that it imidizes, would be expected to remain in the polyimide composition as an inert filler after processing or be incorporated into the polyimide backbone since the additive is known to have a similar chemical stability as the polyimide with which it was blended.

The nature of the interaction between the polymer and the additve during processing has not yet been well defined. One possible explanation involves a plasticization effect in which the more mobile additive molecules break down polymer-polymer chain interactions and internally lubricate the polyimide melt.

Another explanation for the lowering of the apparent melt viscosity of the polyimide-additive compositions involves molecular weight breakdown by the additive. This appears to occur in the 6FDA-BDAF polyimide containing 5% by weight of the PMDA-An.2NMP, di(amic acid) additive. The unmodified 6FDA-BDAF polyimide is known to be soluble in DMAc at ambient temperature, hence one can follow the change in molecular weight during imidization by inherent viscosity changes, assuming that constants in the Mark-Houwink equation are similar for corresponding poly(amic acids) and polyimides. We observed an initial decrease in the inherent viscosity of imidized poly(amic acid) films containing the additive, when dissolved in DMAc, followed by an increase on further thermal aging at 300° C. This phenomenon has also been observed in unmodified poly(amic acid)-polyimide thermal conversions of BDSDA-BDAF film (P. R. Young, N. T. Wakelyn, and A. C. Chang, "Characterization of a Soluble Polyimide" presented at the Society of Plastics Engineers Second International Conference on Polyimides, Ellenville, N.Y., October, 1985) and in the 6FDA-BDAF film (P. R. Young and A. C. Chang, *SAMPE Preprints*, 32, 1051 (1987)).

Figure 6:
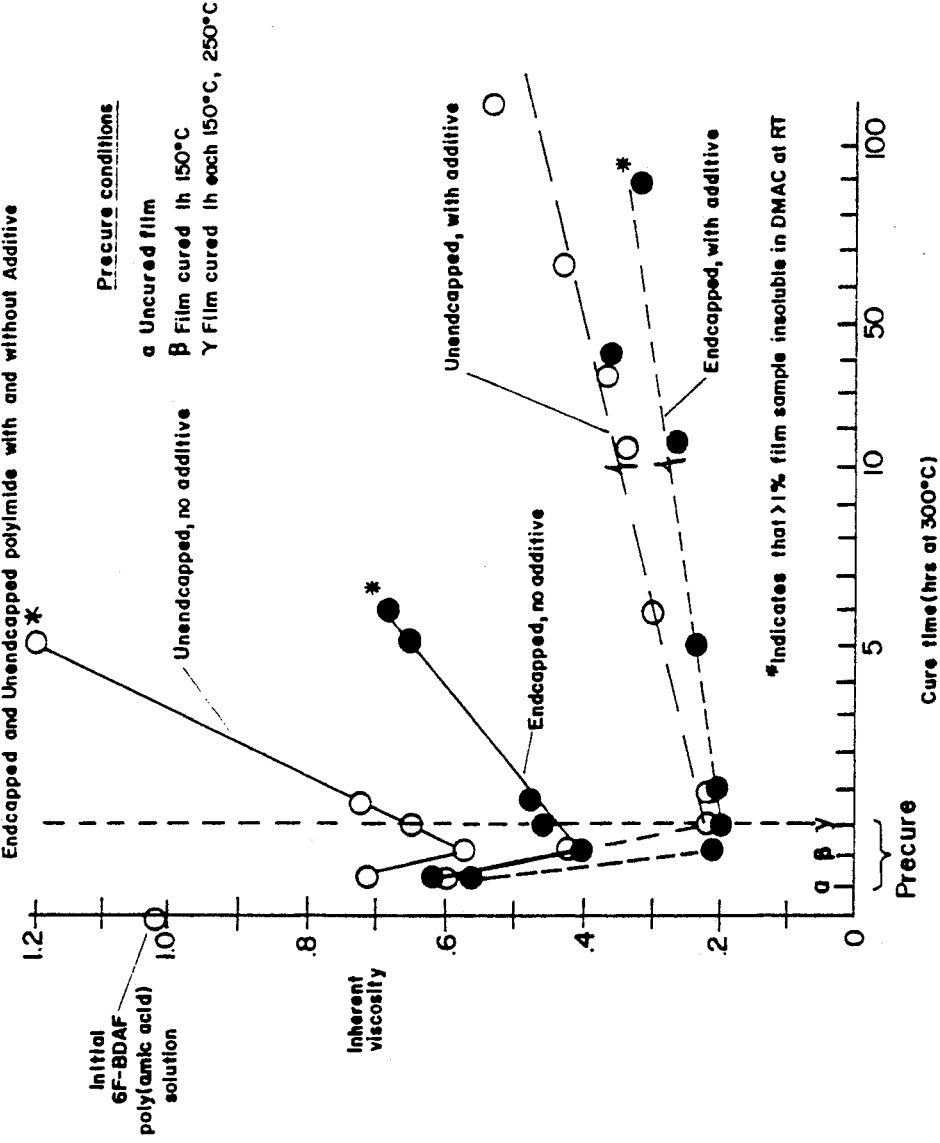
FIG. 6 presents an inherent viscosity-time of imidization study of imidized compositions of 6F-BDAF poly(amic acid) that contain 5 wt. % of the PMDA-AN.2NMP di(amic acid) additive.

This idea is demonstrated in a graph of inherent viscosity vs. time of imidization for the 6FDA-BDAF polyimide (FIG. 6). Films of the corresponding poly(amic acid) were cast from DMAc, air dried in a clean box at low relative humidity, and vacuum dried at ambient temperature. The percent poly(amic acid) solids in each film was estimated by TGA to adjust the sample size for the inherent viscosity. Curve A (unencapped, no additive) shows a rapid decrease in inherent viscosity of the film samples during thermal imidization for 1 hour at 150° C., followed by a complete recovery after heating between 1 hour at 250° C. and at 300° C. Curve B (endcapped with 2.0 mol % phthalic anhydride, no additive) showed a similar behavior, although the recovery in inherent viscosity on imidization occurred from a lower minimum. With addition of the 5.0 wt. % PMDA-An.2 NMP, di(amic acid) additive in Curve C (unencapped, with additive) and curve D (encapped, with additive), additional lowering of the solution viscosity was observed; only partial recovery was noted after extended heating. In all cases but one (curve C), the viscosity experiment was stopped when more than approximately 1% of the film obtained after each imidization step became insoluble in DMAc at ambient temperature.

Based on this inherent viscosity study, the addition of a small amount of additive to both endcapped and unendcapped 6FDA-BDAF poly(amic acid) appears to lower the molecular weight of the polyimide and hence its melt viscosity. Such a molecular weight decrease during imidization would aid the processing of polyimides and would not adversely affect the physical properties of the postcured material in certain applications, e.g. composites or adhesives. For example, a graphite polyimide composite made from LARC-TPI(M) containing 2.5% by weight of the PMDA-An.2NMP, di(amic acid) additive displayed a well consolidated ultrasonic C scan with excellent flexure and short beam shear strength. The composite from the same material containing no additive showed a severe lack of polymer melt flow and inferior composite properties. (N. J. Johnston and T. L. ST. Clair, *SAMPE J*, 23(1), 12(1987).

SPECIFIC EXAMPLES

EXAMPLE 1

Preparation of the 422 Copoly(amic acid) Base Resin

Sublimed 4,4'-oxydianiline (ODA) (49.08 g. 0.2451 mol) was dissolved under nitrogen in 2-methoxyethyl ether (diglyme) in a flamed 2 L reaction kettle equipped with a mechanical stirrer and lid. 4,4'-bis(3,4-dicarboxyphenoxy) diphenylsulfide dianhydride (BDSDA) (250.0 g, 0.4902 mol) was added in one charge, washing traces of the remaining dianhydride into the kettle with the remaining diglyme, requiring a total of 1305 g of this solvent. Stirring was maintained at 300 rpm. After 25 minutes m-phenylenediamine (26.47 g, 0.2448 mol) was added, resulting in the formation of a slurry of stringy solid in a tan solution. The stirring was continued for 18 hours, during which time these suspended particles dissolved and the solution became black and viscous. Phthalic anhydride (0.7260 g, 0.0049 mol) dissolved in 1.70 g of diglyme was then added and the stirring was increased to 700 rpm for 1 hour. The resulting poly(amic acid) solution at 20.0% solids had an inherent viscosity of 0.670 when run in N,N-dimethylacetamide (DMAc) at 0.5% solids solution and 35° C. The solution was stored in a freezer.

Precipitation of this resin was conducted in a large household blender by pouring a slow stream of the base resin solution into the stirred blender two-thirds full of distilled water. The precipitated off-white solid was filtered through cheese cloth, reslurried in distilled water in the blender, refiltered and dried at ambient temperature for 2 days. This solid was further dried for 1 week under vacuum at ambient temperature. The yield of poly(amic acid) powder was 364.5 g (theoretical yield, 326.3 g), indicating that this polymer contained a residual amount of solvent and (or) water.

EXAMPLE 2

Imidization of the 422 Copoly(amic acid) Base Resin

A 170 g sample of the dried copoly(amic acid) resin from Example 1 was imidized in a forced air oven for 1 hour at 100° C. and 1 hour at 220° C. in a large baking dish. The resulting solid was homogenized in a blender to yield 136 g of the imidized 422 base resin.

EXAMPLE 3

Preparation of LARC-TPI(M) Polyimide Film

A solution of 70.00 g of commercial LARC-TPI (Mitsui Toatsu Chemicals, Inc., N.Y.) containing 20.37 g solids in 49.63 g diglyme was further diluted with 65.80 g DMAc. The resulting solution was designated LARC-TPI(M) and contained 15 wt % solids in diglyme/DMAc. A film was cast using about 5 g of this resin onto a soda-lime glass plate using a 15 mil doctor blade gap. The film was placed in a low humidity box (approximately 5-15% rel. humidity) for 1 hour. It was then imidized by heating in a forced air oven for ½ hour at 60° C. and 1 hour each at 100°, 200°, and 300° C. The polyimide film was removed from the glass plate by soaking in warm water. The resulting film was fingernail creaseable and had a Tg of 252° C. A 10% weight loss for the polymer occurred at 516° C. as determined by thermogravimetric analysis.

EXAMPLE 4

Preparation of LARC-TPI(H)

(3,3'4,4'-Benzophenonetetracarboxylic Dianhydride 3,3'-Daiminobenzophenone Polyimide) Solution and Film LARC-TPI(H) was prepared from sublimed BTDA and 3,3'-DABP according to the reaction scheme shown in FIG. 1 (A. K. St. Clair & T. L. St. Clair, *SAMPE Quarterly*, October 1981, pp. 20–25; U.S. Pat. No. 4,065,345 (December 1977)). The polymerization was performed in a closed vessel at 0° C. at a concentration of 15% solids by weight in reagent grade diglyme. The 3,3'-DABP (21.2 g) was slurried in 300 g of diglyme by mechanical stirring. To this mixture BTDA (32.2 g) was added and stirring was continued for at least four hours to insure complete reaction of monomers. Absolute ethanol (31.8 g) was added to render the solution 8.3% ethanol by wt. to prevent precipitation of the polyamic acid. To 10.70 g of this solution containing 1.60 g BTDA/DABP in 9.10 g diglyme was added 5.34 g DMAc. The resulting solution had an inherent viscosity of 0.637 and was designated LARC-TPI(H). It contained 10 wt % solids in diglyme/DMAc. A film was cast from this resin using a 22 mil doctor blade gap. The film was cured according to the process of Example 1. The resulting polyimide film was fingernail creaseable and had a Tg of 257° C. and a 10% wt. loss of 515° C.

EXAMPLE 5

Preparation of the 2,2-Bis[4-(3,4-dicarboxyphenyl)]hexafluoropropane Dianhydride-2,2-Bis[4-(4-aminophenoxy)phenyl] hexafluoropropane Poly(amic acid) [6F-BDAF, Poly(amic acid)]

Recrystallized 2,2-bis[4-(4-aminophenoxy)phenyl] hexafluoropropane (BDAF) (A. K. St. Clair, T. L. St. Clair and K. I, Shevket, ACS Polymeric Materials: Science and Engineering, Proceeding, 51, 62(1984)) (64.189 g, 0.1238 mol) was dissolved in 675.4 g of DMAc at ambient temperature. Recrystallized 2,2-bis[4-(3,4-dicarboxyphenyl)] hexafluoropropane dianhydride (6F) (55.00 g, 0.1238 mol) was then added in two approximately equal portions over a five minute period. The solution was allowed to stir for 20 hours before an inherent viscosity of 1.06 dl/g was measured. The solution can be stored in a freezer for several months before use.

EXAMPLE 6

Endcapping of the 6F-BDAF, Poly(amic acid) Resin from Example 5 with Phthalic Anhydride A 30 g sample of the solution from Example 5 was endcapped with sublimed phthalic anhydride (0.0139 g. 2.00 % by weight of polymer solids) by stirring the solution with the anhydride using a magnetic stirrer for 26 hours at ambient temperature. During this period the inherent viscosity fell from 1.02 to 0.757 dl/g.

EXAMPLE 7

Preparation of the Pyromellitic Dianhydride-Aniline Di(amic acid) Additive Di(NMP) Complex [PMDA-An.2NMP, Di(amic acid)]

A solution of resublimed pyromellitic dianhydride (PMDA) (21.8 g, 0.100 mol) was prepared in a mixture of 125 ml of N,N-dimethylformamide (DMF), 125 ml of N-methylpyrrolidinone (NMP), and 125 ml of 2,2'-dimethoxydiethylether (diglyme) with slight heating to effect solution. After cooling redistilled aniline (18.6 g, 0.200 mol) was added portionwise over a several minute period. The resulting solution exothermed slightly. After stirring over the weekend, a colorless precipitate was filtered and rinsed with toluene. The filtrate was stirred with 750 ml of toluene for several days to afford additional product. The total yield of colorless product was 44.1 g (73,3%) after vacuum drying overnight at ambient temperature. The DTA (FIG. 5) displayed a sharp endotherm at 176° C. (melting); a moderately broad endotherm at 204° C. (loss of NMP); a very broad exotherm extending past 265° C. (imidization), and a sharp endotherm at 444° C. (melting of the diimide). Anal. Calcd. for $C_{32}H_{34}N_4O_8$: C, 63.78; H, 5.69; N, 9.30. Found: C, 63.90; H, 5.87; N. 9.26%. The NMR ($d_6$—DMSO) gave the following spectrum: 11.(2H, s, carboxylic acid), 8.1 (2H, s, pyromellitic aromatic H), 6.9–7.9 (10H, m, aromatic H), 3.3 (4H, t, $CH_2$ of 2-pyrrolidinone ring), 2.7 (6H, s, N—$CH_3$), 1.4–2.48 δ (8H, m, —$CH_2$—$CH_2$—of the 2-pyrrolidinone ring). The carboxylic acid protons did not integrate fully for 2, due to partial exchange in the solvent. Their signal disappeared on addition of $D_2O$. The two NH protons of the amide groups were not observed, again due to rapid exchange in the solvent. Ir(KBr): 2300–3700 (broad, carboxylic acid OH); 1719 (strong, carboxylic acid carbonyl); 1628 (strong, amide I); 1681 (strong, amide I of NMP) 3327 $cm^{-1}$ (strong, amide NH).

EXAMPLE 8

Preparation of the 3,3'4,4'-Benzophenonetetracarboxylic Dianhydride-Aniline Di(amic acid) Additive [BTDA-An,Di(amic acid)]

3,3'4,4'-Benzophenonetetracarboxylic dianhydride (BTDA) (63.4 g, 0.197 mol) and aniline (36.6 g, 0.393 mol) were reacted in a mixture of 75 ml each of NMP and diglyme as in Example 7. After precipitation in a blender with water and air drying, the resulting powder had a differential thermal analysis (DTA) onset melting point of 123° C. After overnight vacuum drying at ambient temperature, the DTA onset melting point was 353° C. (sharp).

Recrystallization of this material from acetone-water at −20° C. gave a solid, m.p. 364.5°–67° C. (decomp.) Anal. Calcd. for $C_{29}H_{20}N_2O_7$: C, 68.50; H, 3.94. Found: C, 68.65; H, 4.22%. Ir(KBr): 3040 (broad carboxylic OH); 1718 (carboxylic carbonyl); 1700 (amide I); 1650 $cm^{-1}$ (benzophenone carbonyl).

EXAMPLE 9

Preparation of the Phthalic Anhydride-Aniline Amid Acid Additive [PA-An, Amic Acid]

A mixture of phthalic anhydride (6.00 g, 0.041 mol) and aniline (3.77 g, 0.041 mol) was dissolved in 50 ml of DMAc and the solution was stirred overnight at ambient temperature. Precipitation from water in a blender followed by recrystallization from acetone-water gave white needles, m.p. 169°–71° C. The melting point was sensitive to the rate of heating. Anal. Calcd. for $C_{14}H_{11}NO_3$: C, 69.71; H. 4.60. Found: C, 69.68; H, 4.67%. Ir(KBr): 3040 (broad carboxylic OH); 1725 and 1640 $cm^{-1}$ (carboxylic and amide I carbonyl).

EXAMPLE 10

Preparation of the 4,4'-Diaminodiphenylmethane-Phthalic Anhydride Di(amic acid) Additive [4,4'-DADPM-PA, di(amic acid)]

A mixture of 4,4'-diaminodiphenylmethane (7.02 g, 0.0354 mol) and phthalic anhydride (10.5 g, 0.0709 mol) in 10 ml of DMAc was stirred overnight at ambient temperature under nitrogen. The product was added to a large excess of water, and the resulting viscous oil was separated by decantation. Crystalline product was obtained from DMAc—$H_2O$ at low temperature, m.p. 308°–11° C. The analysis for the dihydrate was as follows. Anal. Calcd. for $C_{29}H_{22}N_2O_6 \cdot 2H_2O$. C, 65.66; H, 4.94. Found: C, 66.30; H. 5.40%. The dihydrate was refluxed in benzene, then dried in vacuo at ambient temperature. The resulting solid had a m.p. 313°–315°

C. Anal. Calcd. for $C_{29}H_{22}N_2O_6$: C, 70.44; H, 4.48. Found: C, 70.65; H. 4.32%. Ir(KBr): 3040 (broad, carboxylic OH); 1700 cm$^{-1}$ (broad, carboxylic and amide carbonyl).

EXAMPLE 11

Preparation of the 3,3'-Diaminodiphenylmethane-Phthalic Anhydride Di(amic acid) Additive [3,3'-DADPM-PA, Di(amic acid)]

A mixture of 3,3'-diaminodiphenylmethane(3,3'-DADPM) (40.0 g, 0.202 mol) and sublimed phthalic anhydride (60.0 g, 0.405 mol) in 75 ml each of diglyme and NMP was prepared as in Example 7. Precipitation and air curing afforded a powder with a DTA onset melting temperature of 139° C. A sample of the di(amic acid) was recrystallized from acetone-water to afford a solid with a m.p. 183°-86° C. Anal. Calcd. for $C_{29}H_{24}N_2O_7$: C, 67.96; H. 4.72. Found: C, 68.75; H, 4.47%. Ir(KBr): 3040 (broad carboxylic OH); 1700 and 1660 cm$^{-1}$ (carboxylic and amide I carbonyl).

EXAMPLE 12

Preparation of the 3,3',4,4'-Oxydiphthalic Anhydride-Aniline Di(amic acid) Additive [ODPA-An, di(amic acid)]

4,4'-Oxydiphthalic Anhydride (ODPA) (62.5 g, 0.201 mol) and aniline (37.5 g, 0.403 mol) were reacted in 75 ml each of diglyme and NMP for two hours. The bis-(amic acid) produced was precipitated in water in a blender and air dried. The powder had a melt onset temperature of 125° C. by DTA. Recrystallization of a sample of this additive from acetone-water gave large crystals of product, m.p. 292°-94° C. Anal. Calcd. for $C_{28}H_{20}N_2O_7$: C, 67.74; H. 4.03. Found: C, 67.53; H, 4.31%. Ir(KBr): 3040 (broad carboxylic OH); 1700 and 1690 (carboxylic and amide I carbonyl); 1245 cm$^{-1}$ (ether).

EXAMPLE 13

Preparation of the 4,4'-Bis(3,4-dicarboxyphenoxy)diphenyl sulfide dianhydride-Aniline Di(amic Acid) Additive [BDSDA-An, di(amic acid)]

4,4'-Bis(3,4-dicarboxyphenoxy)diphenyl sulfide dianhydride (BDSDA) (73.3 g, 0.144 mol) and aniline (26.7 g, 0.288 mol) were dissolved in 75 ml of NMP and 75 ml of diglyme. After the reaction was complete, the di(amic acid) was precipitated by water in a blender and air dried. It had a sharp onset m.p. of 100° C. by DTA. Anal. Calcd. for $C_{20}H_{28}N_2O_8S$: C, 68.96; H, 4.05; N, 4.02. Found: C, 68.52; H, 4.43; N, 5.34%.

EXAMPLE 14

Preparation of 1,4-Phenylenediamine-Phthalic Anhydride Di(amic acid) Additive [p-PDA-PA, di(amic acid)]

1,4-Phenylenediamine (13.4 g, 0.124 mol) and phthalic anhydride (36.2 g, 0.244 mol) were reacted overnight at ambient temperature in a mixture of 75 ml each of NMP and diglyme. The resulting yellow solution was precipitated in a large volume of water, filtered, and vacuum dried at ambient temperature overnight. The resulting DTA displayed a moderately broad onset melting transition at 194° C., followed by a sharp endothermic melting transition of the imide at 360° C. Anal Calcd. for $C_{22}H_{16}N_2O_6$: C, 65.34; H, 3.99; N, 6.93. Found: C, 64.63; H, 4.35; N, 7.05%. Ir(KBr): 2300-3700 (broad, carboxylic acid OH); 1714 (strong, carboxylic acid carbonyl); 1661 (strong, amide I), 3325 cm$^{-1}$ (strong, amide NH).

EXAMPLE 15

Preparation of the 2,2-bis[4-(4-aminophenoxy)phenyl]hexafluoropropane Phthalic Anhydride Di(amic acid) Additive [BDAF-PA, di(amic acid)]

To a solution of phthalic anhydride (5.9 g, 0.040 mol) in 12 ml each of NMP and diglyme at ambient temperature was added recrystallized 2,2-bis[4-(4-aminophenoxy)phenyl]hexafluoropropane (BDAF) (10.4 g, 0.020 mol). The resulting solution was stirred at ambient temperature for several hours before it was precipitated from water in a blender. After washing three times with water the product was dried in vacuo at ambient temperature for three days. The broad onset m.p. by DTA was 115° C. Anal. Calcd. for $C_{43}H_{28}F_6N_2O_8 \cdot H_2O$: C, 62.02; H, 3.63; N, 3.36. Found: C, 62.16; H, 3.96; N, 3.72%. Ir(KBr): 2500-3700 (broad, carboxylic acid OH); 1716 (strong, carboxylic acid carbonyl); 1661 (strong, amide I); 1255 (strong arylene ether); 3290 cm$^{-1}$ (strong amide NH).

EXAMPLE 16

Preparation of Additional Amic Acid Additives, Endcapped with Aniline (An) or Phthalic Anhydride (PA)

Amic acid additives of the following approximate structure were prepared by reacting the amine and (or) anhydride monomer(s) with the endcap as shown in Table I.

TABLE I

| Monomer Reactant(s) | Endcap |
|---|---|
| BDSDA | An(1:2) |
| 6F DA | An(1:2) |
| BDSDA-4,4'-ODA-BDSDA | An(1:2) |
| BDSDA-1,3-PDA-BDSDA | An(1:2) |
| 4,4'-DDSO$_2$ | PA(1:2) |
| 3,3'-DDSO$_2$ | PA(1:2) |
| 3,3'-DABP | PA(1:2) |
| 3,4'-DABP | PA(1:2) |
| 4,4'-DABP | PA(1:2) |
| 4,4'-ODA | PA(1:2) |
| 1,3-PDA | PA(1:2) |
| 1,3-PDA-BDSDA-1,4-ODA | PA(1:2) |

EXAMPLE 17

Preparation of the N-Phenylphthalimide Additive

The reaction of aniline 3.8 g (0.041 mol) with phthalic anhydride 4.0 g (0.041) mol in 100 ml of refluxing glacial acetic acid for 3 hours, followed by precipitation from water, filtration and vacuum drying at 120° C., afforded an 8.2 g (91%) yield of product, m.p. 205°-9° C. (from ethanol). Lit. reports m.p. 210° C. ("Dict. Org. Cpds", 5, 2740(1965), Oxford Univ. Press, N.Y.). Anal. Calcd. for $C_{14}H_9NO_2$: C, 75.33; H, 4.06. Found: C, 75.10; H, 4.17%. Ir(KBr): 1765, 1700, and 1375 cm$^{-1}$ (imide).

EXAMPLE 18

Preparation of the N,N'-Diphenylpyromellitimide Additive [PMDA-An, diimide]

PMDA (6.0 g, 0.028 mol) and redistilled aniline (5.1 g, 0.055 mol) were refluxed for 3 hours with 75 ml of NMP. The resulting solution was cooled to ambient temperature, and the product crystallized. After drying in vacuo, a 7.6 g (86%) yield of product, m.p. 449°-53° C. was isolated. Lit. reports m.p. 444°-46° C. (R. A. Dine-Hart & W. W. Wright, *Die Makromol. Chem.*, 143, 189(1971)). Anal. Calcd. for $C_{22}H_{12}N_2O_4$: C, 71.74; H, 3.28. Found: C, 71.73; H, 3.45%. Ir(KBr): 1745, 1723, arid 1395 cm$^{-1}$ (imide).

EXAMPLE 19

Preparation of the N,N'-Diphenyl-4,4'-carbonyldiphthalimide Additive [BTDA-An, diimide]

A sample of the BTDA-aniline (1:2) di(amic acid) from Example 8 was heated in a forced air oven for 1 hour at 150° C. The resulting powder had a DTA onset melting point of 346° C. (crude product).

The identical compound was prepared in another experiment by refluxing BTDA (8.00 g, 0.025 mol) and redistilled aniline (4.65 g, 0.050 mol) in 50 ml of glacial acetic acid for 2.5 hours. The resulting mixture was poured onto a large excess of water to precipitate the product. It was further slurried three times in water to remove residual acetic acid and vacuum dried overnight at 100° C. The resulting solid had a m.p. 371°-74° C. Lit. reports m.p. 358°-60° C. (R. A. Dine-Hart & W. W. Wright, *Op. Cit.*, Ex 18). Anal. Calcd. for $C_{29}H_{16}N_2O_5$: C, 73.73; H, 3.41. Found: C, 74.00; H, 3.44%. Ir(KBr): 1771, 1716, 1391 (imide); 1651 cm$^{-1}$ (benzophenone carbonyl).

EXAMPLE 20

Preparation of the N,N'-Diphenyl-4,4'(2,2-hexafluoropropyl)diphthalimide Additive [6F-An, diimide]

The reaction of 6F dianhydride (14.5 g, 0.0327 mol) with aniline (6.20 g, 0.0654 mol) in refluxing glacial acetic acid for 2.5 h as in Example 17 afforded a white powder. The DTA onset temperature was 179° C.; the visual m.p. was 182.5°-184.5° C. Anal. Calcd. for $C_{31}H_{16}F_6N_2O_4$: C, 62.63; H, 2.71; N, 4.71. Found: C, 62.24; H, 2.62; N, 4.65%. Ir(KBr): 1782, 1715 (Imide I); 1375 (Imide II); 1101 (Imide III); 711 cm$^{-1}$ (Imide IV).

EXAMPLE 21

Preparation of the N,N'-Bis(3-trifluoromethylphenyl)-4,4'-2,2-hexafluoropropyl)diphthalimide Additive [6F-3,3'-TFMAn, diimide]

A mixture of 2,2-bis[4-(3,4-dicarboxyphenyl)]hexafluoropropane dianhydride (6F) (25.0 g, 0.0563 mol) and 3-trifluoromethylaniline (18.1 g, 0.114 mol) in 100 ml of glacial acetic acid was refluxed for 2.5 h and then precipitated in a blender with water. Drying in vacuo afforded 25.4 g (62.0%) of crude product, m.p. 160°-66° C. Recrystallization from DMF-water gave 19.2 g (46.6%) of the pure diimide, m.p. 145°-48° C. Anal. Calcd. for $C_{33}H_{14}F_{12}N_2O_4$: C, 54.26; H, 1.93; N, 3.84. Found: C, 54.05; H, 2.07; N, 3,73%. Ir(KBr): 1785, 1730 (Imide I); 1375 (Imide II); 1118 (Imide III); 720 cm$^{-1}$ (Imide IV).

EXAMPLE 22

Preparation of the N,N'-Diphenyl-4,4'-oxydiphthalimide Additive [ODPA-An, diimide]

The reaction of 3,3',4,4'-oxydiphthalic anhydride with redistilled aniline in a molar ratio of 1:2 in refluxing glacial acetic acid according to the procedure in Example 17 afforded this diimide, m.p. 290.5°-292° C. Lit. reports m.p. 296°-97° C. (R. A. Dine-Hart & W. W. Wright, *Die Makromol. Chem.*, 143, 189(1971)). Anal. Calcd. for $C_{28}H_{16}N_2O_5$. C, 73.04; H, 3.48. Found: C, 72.97; H, 3.64%. Ir(KBr): 1780 and 1700 (doublet), 1380 cm$^{-1}$ (imide). Lit. reports m.p. 296°-97° C.

EXAMPLE 23

Preparation of the N,N'-Bis(4-benzoylphenyl)-4,4'-(2,2-hexafluoropropyl)-diphthalimide Additive [6F-4-ABP, diimide]

The reaction of 2,2-bis[4-(3,4-dicarboxyphenyl)] hexafluoropropane dianhydride (6F) (5.9 g, 0.013 mol) with 4-aminobenzophenone (5.3 g, 0.027 mol) in refluxing glacial acetic acid as in Example 17 afforded product with a m.p. 254°-56° C. (from acetic acid-water). Anal. Calcd. for $C_{45}H_{24}F_6N_2O_6$: C, 67.34; H, 3.01; N, 3.49. Found: C, 66.78; H, 3.15; N, 3.33%. Ir(KBr); 1780 and 1720 (Imide I), 1380 (Imide II), 1105 (Imide III), 710 cm$^{-1}$ (Imide IV).

EXAMPLE 24

Preparation of the N,N'-(Methylenedi-1,4-phenylene)diphthalimide Additive [p-MDA-PA, diimide]

The reaction of 4,4'-methylenedianiline (6.0 g, 0.030 mol) with phthalic anhydride (9.0 g, 0.061 mol) in refluxing glacial acetic acid for 3 h as in Example 17 afforded 11 g (81%) of the diimide product, m.p. 311°-14.5° C., after recrystallization from DMAc. Anal Calcd. for $C_{29}H_{18}N_2O_4$: C, 75.97; H, 3.96. Found: C, 76.01; H, 4.18%. Ir(KBr): 1769, 1720, 1368 cm$^{-1}$ (imide).

EXAMPLE 25

Preparation of the N,N'(Methylenedi-1,3-phenylene)diphthalimide [m-MDA-PA, diimide]

The reaction of 3,3'-MDA (6.0 g, 0.030 mol) with phthalic anhydride (9.0 g, 0.061 mol) in 75 ml of refluxing glacial acetic acid for 5.5 h as in Example 17 afforded 13.0 g (89%) of the diimide, m.p. 254°-55° C. Anal. Calcd. for $C_{29}H_{18}N_2O_4$: c,75.97; H, 3.96. Found: C, 75.87; H, 3.93%. Ir(KBr): 1760, 1710, 1370 cm$^{-1}$ (imide).

EXAMPLE 26

Preparation of the N,N'-[[2,2-bis[4-(4-phenoxy)phenyl]hexafluoropropyl]] diphthalimide Additive [BDAF-PA, diimide]

The reaction of 2,2-bis[4-(4-aminophenoxy)phenyl] hexafluoropropane (BDAF) (26.6 g, 0.0514 mol) with phthalic anhydride (15.2 g, 0.103 mol) in 80 ml of glacial acetic acid at reflux for 3.5 h as in Example 17 afforded 33.3 g (83.2%) of the diimide product, m.p. 213.5°-214.5° C. Anal. Calcd. for $C_{43}H_{24}F_6N_2O_6$: C, 66.33; H, 3.11; N, 3.60. Found: C, 66.28; H, 3.17; N, 3.54%. Ir(KBr): 1793 and 1710 (Imide I), 1396 (Imide II); 1115 (Imide III), 711 (Imide IV) 1243 cm$^{-1}$ (arom. ether).

EXAMPLE 27

Preparation of Additional Imide Additives Endcapped with Aniline (An), Phthalic Anhydride (PA), or Miscellaneous Endcaps Certain amic acid additives from the previous examples were thermally imidized in a circulating air oven for 1 h at 290° C. or 3 h at 180° C. (Table II).

TABLE II

| Monomer Reactant(s) | Endcap |
|---|---|
| BDSDA* | An(1:2) |
| BDSDA-1,3-PDA-BDSDA | An(1:2) |
| BDSDA-4,4'-ODA-BDSDA | An(1:2) |
| 4,4'-DDSO$_2$ | PA(1:2) |
| 3,3'-DDSO$_2$ | PA(1:2) |
| 4,4'-ODA | PA(1:2) |
| 3,3'-DABP | PA(1:2) |
| 3,4'-DABP | PA(1:2) |
| 4,4'-DABP | PA(1:2) |
| 1,3-PDA-BDSDA-4,4-ODA | PA(1:2) |
| 6F Dianhydride | 2-aminoanthracene (1:2) |
| BDSDA | N-(3-aminobenzoyl)piperidine |

*4,4'-bis(3,4-dicarboxyphenoxy)diphenyl sulfide dianhydride

EXAMPLE 28

Thermal Imidization of Amic Acid Additives

The thermal imidization of certain amic acid additives from the previous examples was effected by heating the amic acid powders in a forced air oven for 1 h at 150° C. The melting points of the resulting imides were generally broader and lower than those identical compounds prepared by chemical imidization in refluxing glacial acetic acid. For example, the m.p. range of the BTDA-AN, diimide as determined by DTA was 331°–55° C. (DTA onset m.p., 346° C.). The m.p. obtained after refluxing in glacial acetic acid and vacuum drying was 371°–74° C. Lit. reports m.p. 358°–60° C. (R. A. Dine-Hart & W. W. Wright, Op. Cit., Ex 18).

EXAMPLE 29

Reprecipitation and Imidization of the 422 Copoly(amic acid) Base Resin

A 14.0 g sample of the 422 copoly(amic acid) powder from Example 1 was dissolved in 27 ml of DMAc, precipitated in water in a blender, air dried overnight, and cured in a forced air oven for 1 h each at 100° C. and 220° C. It was homogenized in a blender to give 9.01 g of a light tan powder.

EXAMPLE 30

Polyimide Composition of the 422 Copolymer Base Resin Containing 0.05% by wt. of the PMDA-An Di(amic acid) Additive The PMDA-AN di(amic acid) additive (0.005 g) was added to 27 ml of DMAc and stirred for several minutes. The 422 copolyimide base resin (14.0 g) from Example 2 was then added to form a very viscous, incomplete solution. After several hours stirring at ambient temperature the heterogeneous mixture was precipitated with water in a blender. The resulting pale tan powder was air dried and then cured in a forced air oven 1 h at 100° C. and 1 h at 220° C. The yield was 13.7 g.

EXAMPLE 31

Polyimide Composition of the 422 Copolyimide Base Resin Containing 0.50% by wt. PMDA-AN Diimide The PMDA-AN diimide additive (0.0704 g) was dissolved in 27 ml DMAc; 14.0 g of the 422 copolyimide base resin was added. Almost all of the additive dissolved, whereas the polyimide powder became dispersed in the DMAc solution. The dispersion was precipitated with water in a blender and the resulting powder was filtered, air dried overnight, and heated 1 h at 100° C. then 1 h at 220° C. in a forced air oven. The yield of tan powder was 13.4 g.

EXAMPLE 32

Polyimide Composition of the 422 Copoly(amic acid) Base Resin Containing 2.5% by wt. of the PMDA-AN Di(amic acid) Additive A solution of 0.359 g of the PMDA-AN di(amic acid) additive and 14.0 g of the 422 copoly(amic acid) base resin was prepared by mixing the two dry powders with 27 ml of DMAc at ambient temperature. After a three hour period this solution was poured onto water in a household blender, and the resulting precipitate was air dried overnight before curing in a forced air oven for one hour each at 100° C. and 220° C. The resulting light tan solid was pulverized in a blender to yield 9.57 g of small spheres of the polyimide composition.

EXAMPLE 33

Polyimide Composition of the 422 Copoly(amic acid) Base Resin Containing 5.0% by wt. of the PMDA-AN Di(amic acid) Additive As in Example 32 a solution of 13.0 g of the 422 copoly(amic acid) base resin and 0.684 g of the PMDA-An di(amic acid) additive was prepared in 25 ml DMAc at ambient temperature and stirred for several hours. The powder was prepared by precipitation from water in a blender, followed by air drying overnight and curing in a forced air oven for 1 h each at 100° C. and 220° C. to yield 9.71 & of light tan powder.

EXAMPLE 34

Preparation of the 422 Copolyimide Base Resin Containing 5.0% by wt. of PMDA-An Diimide Additive A mixture of 11.0 g of the imidized 422 copolyimide base resin (Example 2) and 0.579 g of N,N'-diphenylpyromellitimide was prepared. The two powders were mixed in a blender at full power for 1 min. to give a 5.0% by weight of the mixture.

EXAMPLE 35

Polyimide Composition of the 422 Copoly(amic acid) Base Resin Containing 2.5% by wt. of the BTDA-AN Diimide Additive A 14 g sample of the 422 copoly(amic acid) base resin was mixed with 0.36 g of the BTDA-An diimide additive in 27 ml DMAc at ambient temperature for several days. Most of the material dissolved to form a pale green suspension. The mixture was precipitated with water in a blender, air dried, and cured in a forced air oven for 1 h each at 100° C. and 220° C.

EXAMPLE 36

Polyimide Composition of the 422 Copolyimide Base Resin Containing 5.0% by wt. of Napthalene as the Additive An 11 g sample of the 422 copolyimide base resin (Example 2) was mixed with 0.58 g of napthalene in a blender at high speed for 1 min. The viscosity of the resulting sample was measured by capillary rheometry.

EXAMPLE 37

Polyimide Composition of the 422 Copoly(amic acid) Base Resin Containing 2.5% by wt. of the p-PDA-PA, Di(amic acid) Additive A 14 g sample of the 422 copoly(amic acid) base resin was mixed with 0.36 of the p-PDA-PA, di(amic acid) additive, and the mixture was completely dissolved in 27 ml DMAc at ambient temperature. This solution was precipitated in a blender with water, filtered, air dried for several days, and cured in a forced air oven for 1 h each at 100° C. and 220° C.

EXAMPLE 38

Polyimide Composition of the 422 Copoly(amic acid) Base Resin Containing 5.0% by wt. of the p-PDA-PA Di(amic acid) Additive As in Example 37 a mixture of 14.0 g of the powdered 422 copoly(amic acid) resin powder and 0.737 g of the p-PDA-PA di(amic acid) additive was dissolved with stirring overnight in 27 ml DMAc. Isolation by precipitation in water, air drying, and imidization for 1 h each at 100° C. and 220° C. in a forced air oven afforded 10.2 g of the composition as a tan powder.

EXAMPLE 39

Polyimide Composition of the 422 Copoly(amic acid) Base Resin Containing 2.5% by wt. of the 4,4'-ODA-PA Diimide Additive A 0.36 g sample of the 4,4'-ODA-PA diimide additive was dissolved in 37 ml DMAc at ambient temperature before 14.0 g of the 422 copoly(amic acid) base resin powder was added and stirred overnight at ambient temperature. The resulting solution was precipitated from water in a blender, air dried, and cured in a forced air oven 1 h each at 100° C. and 220° C.

EXAMPLE 40

Polyimide Composition of the 422 Copolyimide Base Resin containing 5.3% by wt. of the 6F-An Diimide Additive A 10.4 g sample of the 422 copolyimide base resin was mixed with 0.58 g of the 6F-An diimide additive by blending the two powders for 1 min. in a CRC homogenizer. The recovery of mixture was 10.8 g (98%).

EXAMPLE 41

Polyimide Composition of the 422 Copolyimide Base Resin Containing 15% by wt. of the 6F-An, Diimide Additive A mixture of 10.0 g of the imidized 422 copolyimide base resin and 1.77 g of the 6FDA-An, diimide additive was combined in a laboratory blender for 1 min. at high speed. The viscosity of the resulting melt obtained by capillary rheometry at 350° C. was too low to be measured.

EXAMPLE 42

Polyimide Composition of the 422 Copolyimide Base Resin Containing 5.3% by wt. of the 6F-TFMAn Diimide Additive A 10.4 g sample of the 422 copolyimide base resin was mixed with 0.58 g of the 6F-TFMAn additve by blending the two powders for 1 min. in a CRC homogenizer. The recovery of mixture was 20.8 g (98%).

EXAMPLE 43

Figure 7:
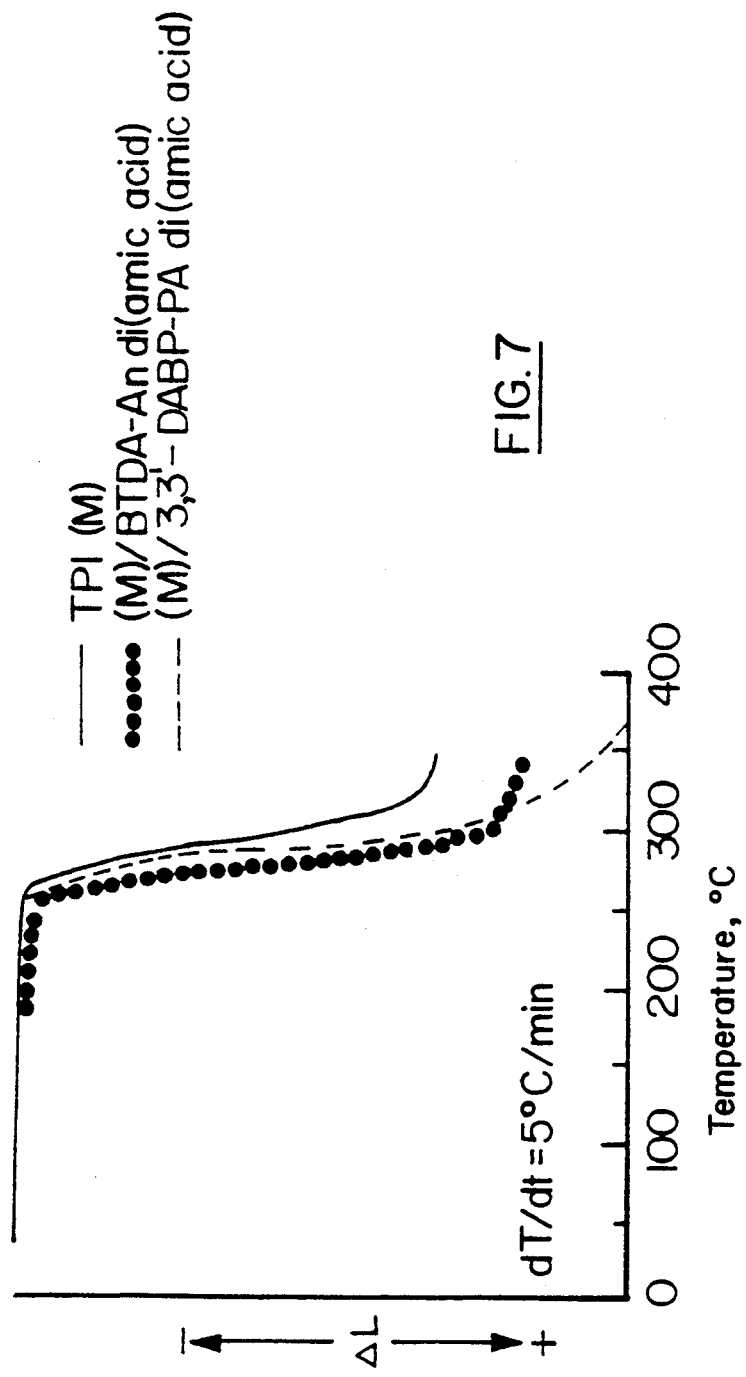
FIG. 7 gives the TMA of LARC-TPI(M) films containing 3 wt. % additive.

Film Formation from a Composition of LARC-TPI(M) and 3.0% by Weight of the BTDA-An Di(amic acid) Additive To 10.69 g of the LARC-TPI(M) solution of Example 3 was added 0.048 g of the diamic acid additive of BTDA-An of Example 8. The mixture was stirred for approximately 3 hours at room temperature. A film was prepared according to the process of Example 3. The resulting film was very brittle and had a Tg of 247° C. 10% weight loss occurred at 517° C. TMA data as shown in FIG. 7 indicated a slightly improved processability over the TPI(M) control film.

EXAMPLE 44

Figure 8:
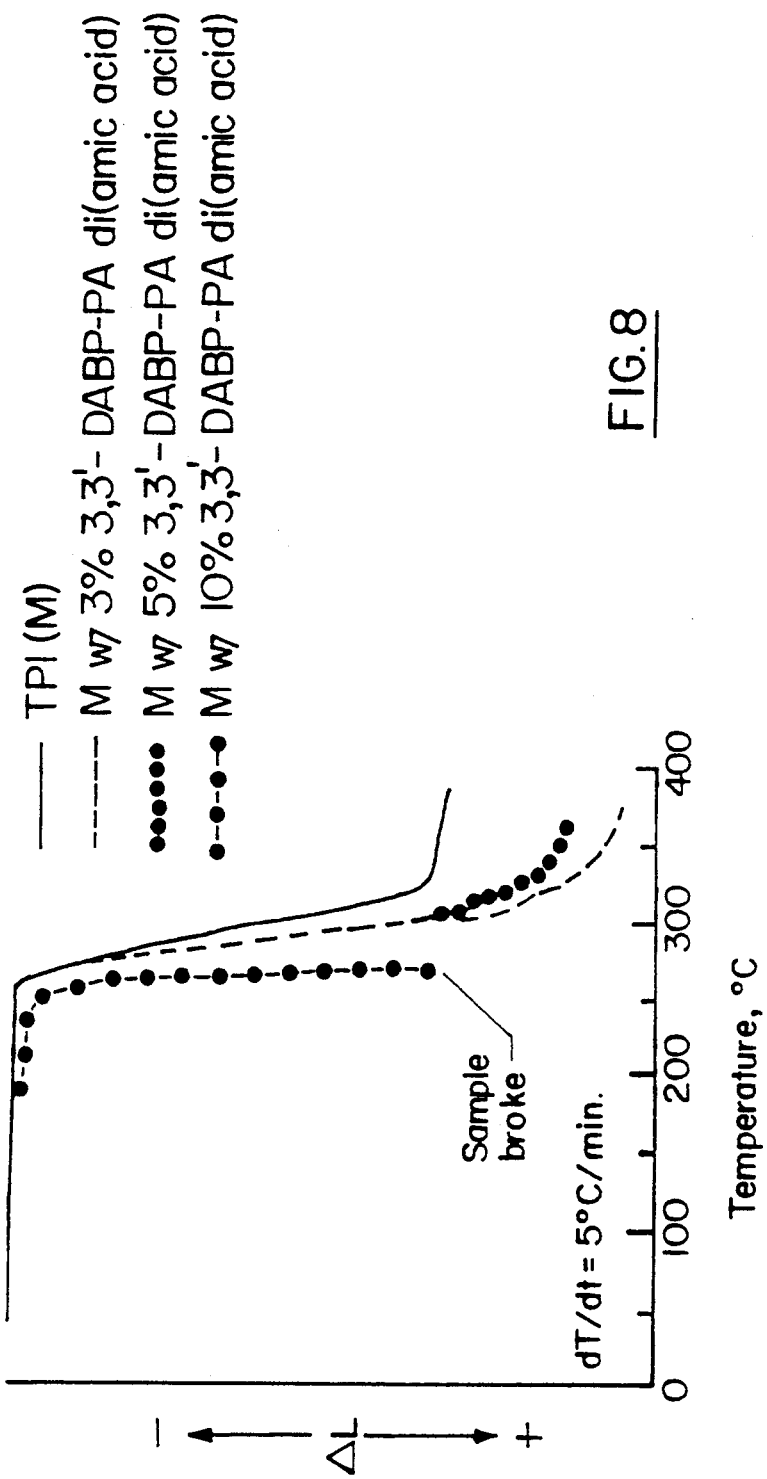
FIG. 8 gives the effect of additive concentration on the TMA of LARC-TPI(M) films.

Film Formation From a Composition of LARC-TPI(M) and 3.0% by Weight of the 3,3'-DABP-PA Di(amic acid) Additive The process of Example 43 was repeated using 0.048 g of 3,3'-DABP-PA of Example 16 as the diamic acid additive. The resulting polyimide film was slightly brittle, having a Tg of 248° C. and showing 10% weight loss at 519° C. TMA data as shown in FIGS. 7 and 8 indicated slightly improved melt flow properties.

EXAMPLE 45

Extended Cure of a LARC-TPI(M) Film Containing 3.0% by Weight of the 3,3'-DABP-PA Di(amic acid) Additive The process of Example 44 was repeated, leaving the film at 300° C. for 18 hours instead of 1 hour. The resulting film was flexible and fingernail creaseable. The Tg of the polymer was 255° C; a 10% weight loss occurred at 505° C.

EXAMPLE 46

Film Formation From a Composition of LARC-TPI(M) and 5% by Weight of the 3,3'-DABP-PA Di(amic acid) Additive The process of Example 43 was repeated using 0.080 g of the 3,3'-DABP-PA additive of Example 16. The resulting polyimide film was brittle, having a Tg of 247° C. and showing 10% weight loss at 536° C. TMA data as shown in FIG. 8 indicated slightly improved processability.

EXAMPLE 47

Film Formation From a Composition of LARC-TPI(M) and 10% by Weight of the 3,3'-DABP-PA Di(amic acid) Additive The process of Example 43 was repeated using 0.160 g of the 3,3'-DABP-PA additive of Example 16. The resulting film was brittle and contained flecks of insoluble additive. The Tg of the film was 252° C., and 10% weight loss occurred at 509° C. TMA data (FIG. 8)

indicated substantially improved processability, although the film sample broke during testing.

EXAMPLE 48

Film Formation From a Composition of LARC-TPI(M) and 3.01 by Weight of the PMDA-An.2NMP Di(amic acid) Additive The process of Example 43 was repeated using 0.048 g PMDA-An.2NMP of Example 7 as the diamic acid additive. The resulting film powdered on removal from the glass plate.

EXAMPLE 49

Extended Cure of a LARC-TPI(M) Film Containing 3.0% by Weight of the PMDA-An.2NMP Di(amic acid) Additive The process of Example 48 was repeated except that the film was imidized by heating for ½ hour at 60° C., 1 hour at 100° C. 1 hour at 200° C. and 65 hours at 300° C. The resulting film was fingernail creaseable. The Tg of the polymer was 257° C.

EXAMPLE 50

Figure 9:
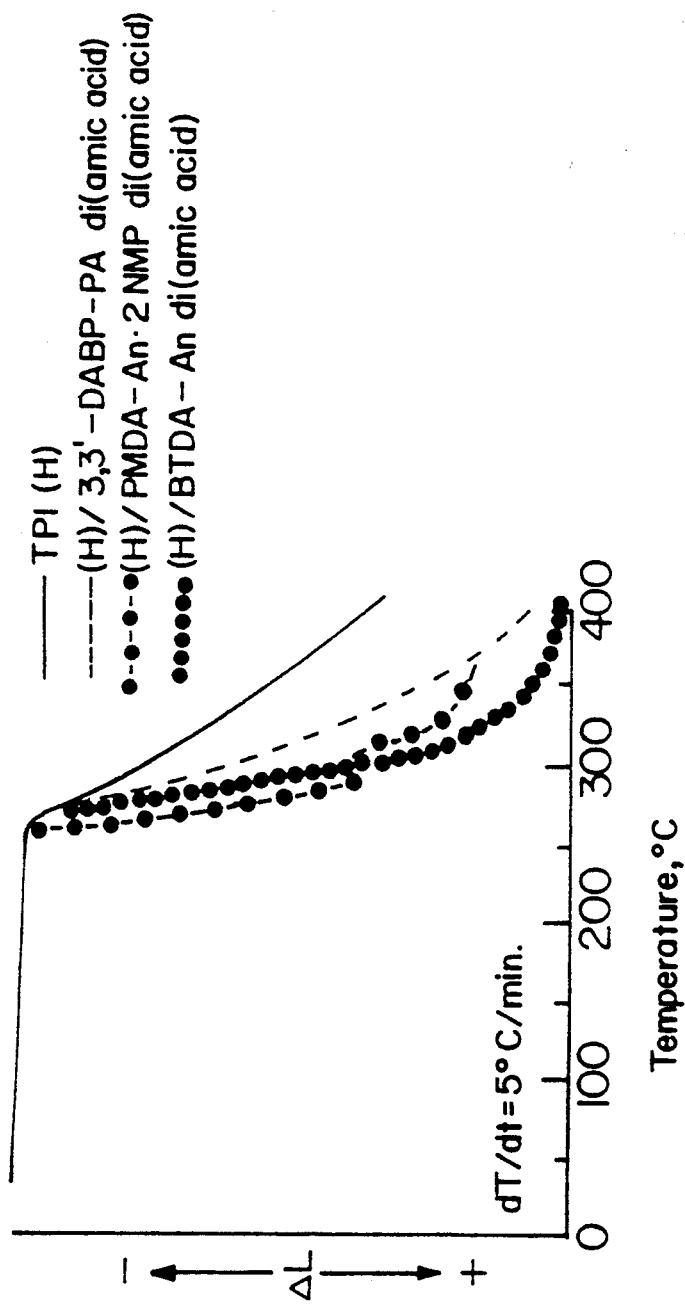
FIG. 9 gives the TMA of LARC-TPI(H) films containing 3 wt. % additive.

Film Formation From a Composition of LARC-TPI(H) and 3.0% by Weight of the BTDA-An Di(amic acid) Additive To 16.04 g of the LARC-TPI(H) solution of Example 4 was added 0.048 g of the BTDA-An di(amic acid) additive of Example 8. The mixture was stirred for about 3 hours at room temperature. Subsequently, the mixture was poured onto a soda-lime glass plate and spread using a doctor blade with a 22 mil blade gap. The film was placed in a dry box (approximately 5–15% relative humidity) for 1 hour. It was then imidized by heating in a forced air oven for ½ hour at 60° C. and 1 hour each at 100°, 200° and 300° C. The polyimide film was removed from the glass plate by soaking in warm water. The resulting flexible film had a Tg of 252° C.; 10% weight loss occurred at 507° C. TMA data (FIG. 9) indicated substantially improved processability.

EXAMPLE 51

Figure 10:
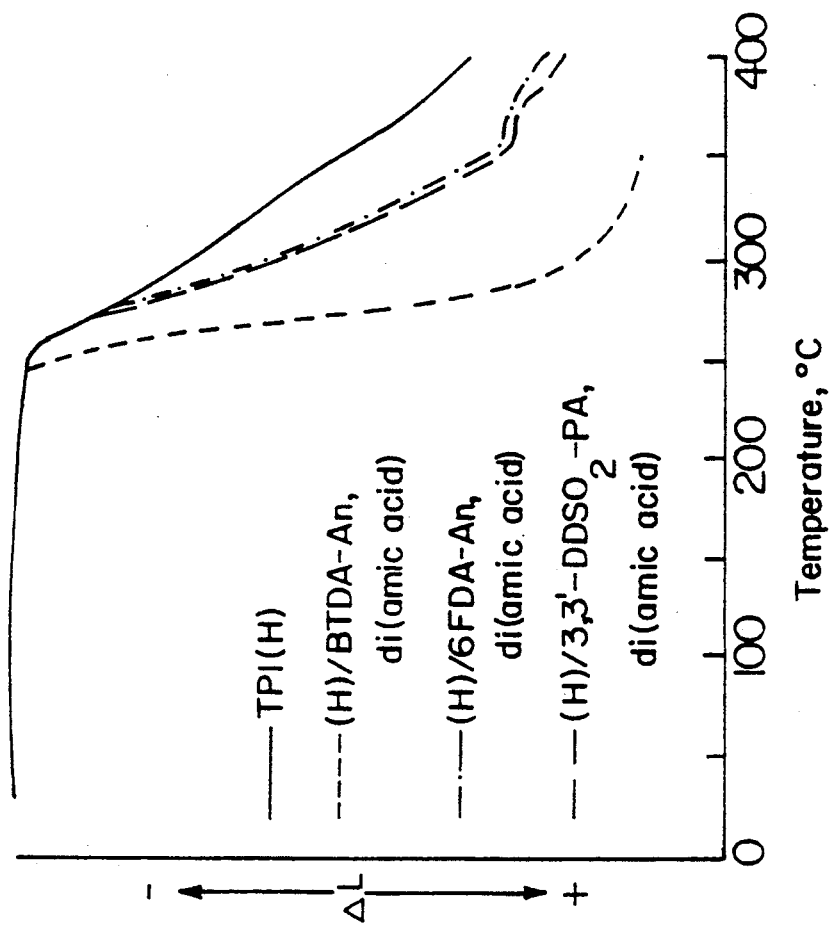
FIG. 10 gives the TMA of LARC-TPI(H) films containing 5 wt. % additive.

Film Formation From a Composition of LARC-TPI(H) and 5.0% by weight of the BTDA-An Di(amic acid) Additive The process of Example 50 was repeated using 0.080 g of the BTDA-An di(amic acid) additive of Example 8. The resulting film was brittle and had a Tg of 249° C. with 10% weight loss occurring at 503° C. TMA data (FIG. 10) for this film was essentially unchanged from that of Example 50.

EXAMPLE 52

Film Formation From a Composition of LARC-TPI(H) and 3.0% by Weight of the 3,3'-DABP-PA Di(amic acid) Additive The process of Example 50 was repeated using 0.048 g of the 3,3'-DABP-PA di(amic acid) additive of Example 16. The resulting flexible polyimide film had a Tg of 252° C. and 10% weight loss occurring at 496° C. TMA data (FIG. 9) indicated improved processability.

EXAMPLE 53

Film Formation From a Composition of LARC-TPI(H) and 3.0% by Weight of the PMDA-An.2NMP Di(amic acid) Additive The process of Example 50 was repeated using 0.048 g of the PMDA-An.2NMP di(amic acid) of Example 7. The polyimide consisted of brittle pieces of film with a Tg of 250° C. and displayed 10% weight loss at 488° C. TMA data (FIG. 9) indicated substantially improved processability.

EXAMPLE 54

Extended Cure of a LARC-TPI(H) Film Containing 3.0% by Weight of the PMDA-An.2NMP Di(amic acid) Additive The process of Example 53 was repeated except that the 300° C. cure was extended to 65 hours. A fingernail creaseable film with a Tg of 279° C. resulted.

EXAMPLE 55

Film Formation From a Composition of LARC-TPI(H) and 5.0% by Weight of the 6FDA-An Di(amic acid) Additive The process of Example 50 was repeated using 0.080 g of the 6FDA-An di(amic acid) additive of Example 16. The resulting flexible film had a Tg of 248° C.; a 10% weight loss occurred by 513° C. TMA data (FIG. 10) indicated a slight improvement in processability.

EXAMPLE 56

Film Formation From a Composition LARC-TPI(H) and 5.0% by Weight of the 3,3'-DDSO$_2$PA Di(amic acid) Additive The process of Example 50 was repeated using 0.080 g of the 3,3'-DDSO PA di(amic acid) additive of Example 16. The resulting flexible film had a Tg of 250° C. and displayed a 10% weight loss at 530° C. TMA data (FIG. 10) indicated a slight improvement in processability.

EXAMPLE 57

Preparation and Characterization of a LARC-TPI Polyimide Graphite Composite Modified with a PMDA-aniline Di(amic acid) Additive A 2.5 wt. % solution of the PMDA-An.2NMP di(amic acid) additive (based on the poly(amic acid) solids) was dissolved in a 29–30% solution of LARC-TPI di(amic acid) in diglyme (Mitsui Toatsu Chemicals, Inc., N.Y., inherent viscosity at 0.5% (wt./vol) and 35° C. of 0.52 dl/g). Unsized Hercules AS-4 12K tow carbon fiber was passed through the dip tank and the coated fiber was wound onto an 18-inch diameter drum wrapped with release paper. The tank was equipped with three Teflon ® roll bars over which the tow was threaded to spread the filaments and aid wetting. Dies attached to the exit side of the tank controlled the resin pickup. Prepreg sheets 57 in × 75 in were generated.

Prior to molding the prepregs were B-staged one hour at 218° C. Plies were trimmed to size and stacked in a mold between Kapton ® film spray-coated with Frekote 33 ®. Molding was conducted in a 12 ton or 25 ton press containing 12-inch platens heated with electrical resistance cartridge heaters. Laminates were prepared by heating B-staged prepregs at 350° C. and 350 psi for one hour. The resulting panels were approximately 0.1 in thick and contained about 50% fiber by volume. They were nondestructively tested for flow out of resin with an Automation Industries Model S-80 ultrasonic scanner. The details of this test and the composite characterization have been reported (N. J. Johnston and T. L. St. Clair, "Thermoplastic Matrix Composites: LARC-TPI, Polyimidesulfone and Their Blends" in the 18th *National Tech. SAMPE Conference, Preprints,* Seattle, Wash., October, 1986).

The ultrasonic c-scans of the modified polyimide composite were good, indicating melt flow out of the polyimide resin in the graphite matrix to from a well-consolidated material. Although composites from the unmodified composition appeared well consolidated, they gave poor ultrasonic c-scans. This phenomenon is further illustrated in FIG. 11, which compares drawings made from photomicrographs of unmodified and additive-modified LARC-TPI graphite composites. One clearly sees poorer flow and channeling in the unmodified LARC-TPI composite than in the composite containing 2% by weight of the PMDA-An.2NMP di(amic acid) additive. Furthermore, as shown in Table III, the short beam shear strength (SBS St.) and the flexural strength (Flex St.) were significantly improved in the composite containing the additive.

TABLE III

| | | Short Beam Shear and Flexure Properties of LARC-TPI Composites. | | | | |
|---|---|---|---|---|---|---|
| TEST TEMP., °C. | SBS ST., Ksi | STD. DEV., Ksi | FLEX. ST., Ksi | STD. DEV., Ksi | FLEX. MOD., Msi | STD. DEV., Msi |
| | | LARC-TPI | | | | |
| RT | 9.2 | 0.7 | 137 | 48 | 12.8 | 2.8 |
| 93 | 8.8 | 0.5 | 121 | 19 | 12.6 | 0.5 |
| 149 | 8.4 | 1.0 | 111 | 15 | 11.1 | 1.4 |
| 177 | 7.8 | 0.2 | 99 | 20 | 12.1 | 2.7 |
| | | LARC-TPI, 2.5 WT. % ADDITIVE | | | | |
| RT | 13.5 | — | 242 | — | 14.7 | — |
| 93 | 12.0 | — | 213 | — | 14.4 | — |
| 205 | 8.4 | — | 160 | — | 14.1 | — |

The specific examples herein described are given to illustrate the invention and are not to be construed as exhaustive. Various modifications and variations of the present invention will be apparent to those skilled in the art without departing from the spirit and scope of the claims of this invention.

What is claimed is:

1. A low molecular weight amic acid or imide additive improving the melt processability of high molecular weight poly(amic acids) and polyimides, the additive selected from the group consisting of:

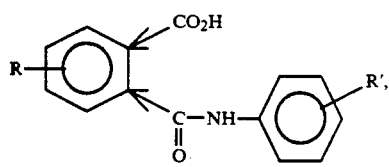

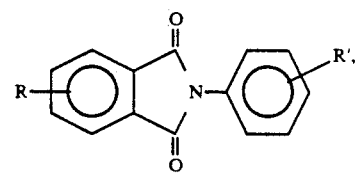

-continued

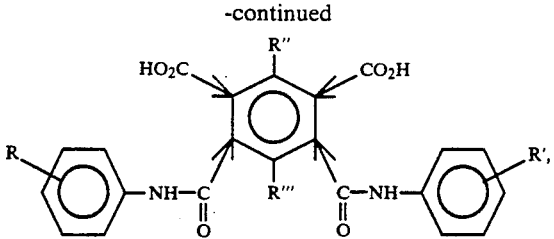

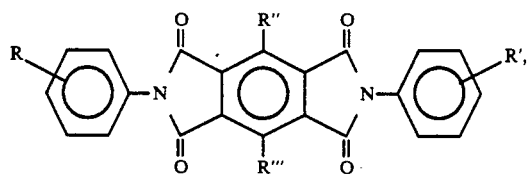

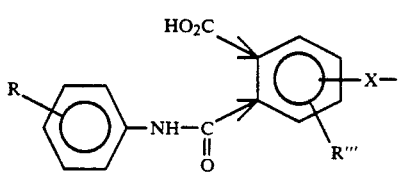

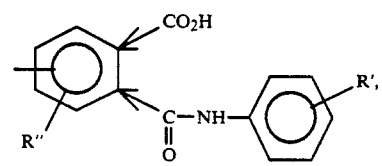

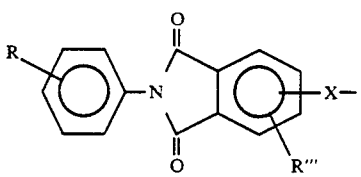

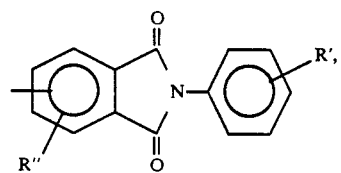

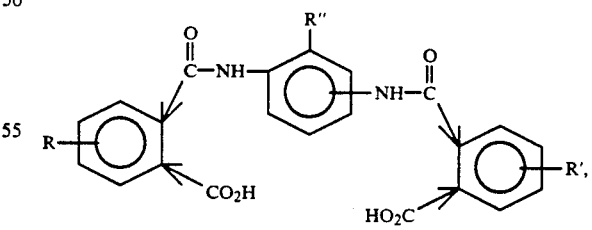

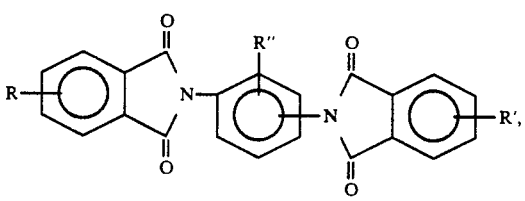

-continued

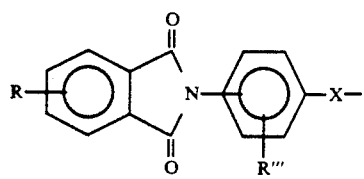

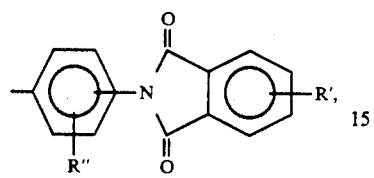

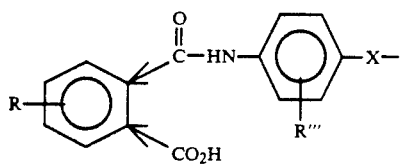

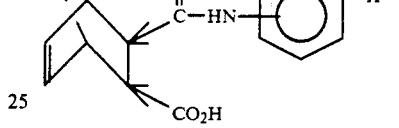

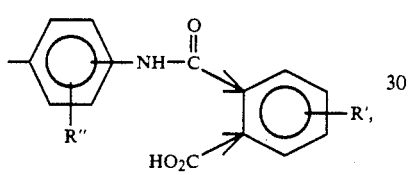

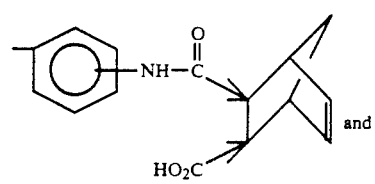

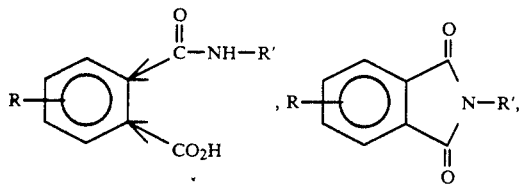

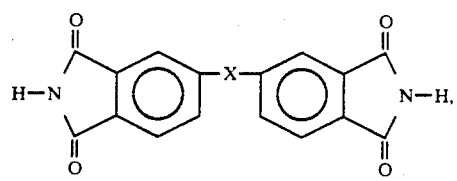

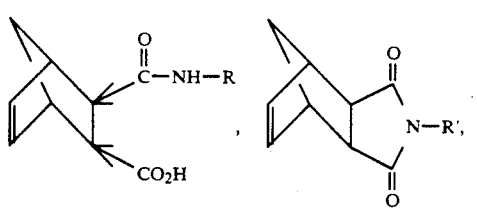

wherein
R, R', R", and R''' are selected from the group consisting of hydrogen, alkyl, alkylaryl, alkyloxy, aryloxy, aryl, halogen, and haloalkyl; and
x is a bond or is selected from the group consisting of oxo, thio, methylene, carbonyl, 2,2-hexafluoropropyl, sulfone, and 4,4'-thiodiphenoxy; and
wherein arrows drawn from a group to an aromatic ring represent any amic acid isomer or isomer mixture.

* * * * *